(12) United States Patent
Kondo

(10) Patent No.: US 12,493,162 B2
(45) Date of Patent: Dec. 9, 2025

(54) LENS BARREL AND IMAGING DEVICE

(71) Applicant: FUJIFILM Corporation, Tokyo (JP)

(72) Inventor: Nobuyuki Kondo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 863 days.

(21) Appl. No.: 17/742,049

(22) Filed: May 11, 2022

(65) Prior Publication Data

US 2022/0373765 A1 Nov. 24, 2022

(30) Foreign Application Priority Data

May 18, 2021 (JP) ................................. 2021-084011

(51) Int. Cl.
*G02B 7/10* (2021.01)
(52) U.S. Cl.
CPC ...................................... *G02B 7/10* (2013.01)
(58) Field of Classification Search
CPC ......... G02B 7/10; G02B 7/102; G03B 17/112
USPC ....................................................... 359/822
See application file for complete search history.

(56) References Cited

U.S. PATENT DOCUMENTS

| 8,608,649 | B2 | 12/2013 | McWeeney et al. |
| 2005/0272975 | A1 | 12/2005 | McWeeney et al. |
| 2015/0070759 | A1 | 3/2015 | Yamamoto |
| 2017/0351053 | A1* | 12/2017 | Shinano .................. G02B 7/09 |
| 2020/0367723 | A1 | 11/2020 | Yoshinaga et al. |

FOREIGN PATENT DOCUMENTS

| CN | 111447866 | A | 7/2020 | |
| JP | H09-015481 | A | 1/1997 | |
| JP | H09-043683 | A | 2/1997 | |
| JP | 2007-279485 | A | 10/2007 | |
| JP | 2007-530155 | A | 11/2007 | |
| JP | 2016-157029 | A | 9/2016 | |
| JP | 2016173604 | A | * 9/2016 | ........... G03B 21/142 |
| JP | 2016-224471 | A | 12/2016 | |
| JP | WO2019/123814 | A1 | 11/2020 | |

OTHER PUBLICATIONS

An Office Action; "Notice of Reasons for Refusal," mailed by the Japanese Patent Office on Oct. 1, 2024, which corresponds to Japanese Patent Application No. 2021-084011 and is related to U.S. Appl. No. 17/742,049; with English language translation.

* cited by examiner

*Primary Examiner* — Stephone B Allen
*Assistant Examiner* — Boutsikaris Leonidas
(74) *Attorney, Agent, or Firm* — Studebaker Brackett PLLC

(57) ABSTRACT

A lens barrel has a dial operation member that adjusts an optical function of an imaging optical system, a restriction operation member having a first inclined surface inclined with respect to a movement direction from a release position toward a restriction position, and a cam member provided between the restriction operation member and the dial operation member and having a second inclined surface. In a case where the restriction operation member is moved to the release position, the dial operation member is put into a release state. In a case where the restriction operation member is in the restriction position, the cam member puts the dial operation member into a restriction state.

26 Claims, 15 Drawing Sheets

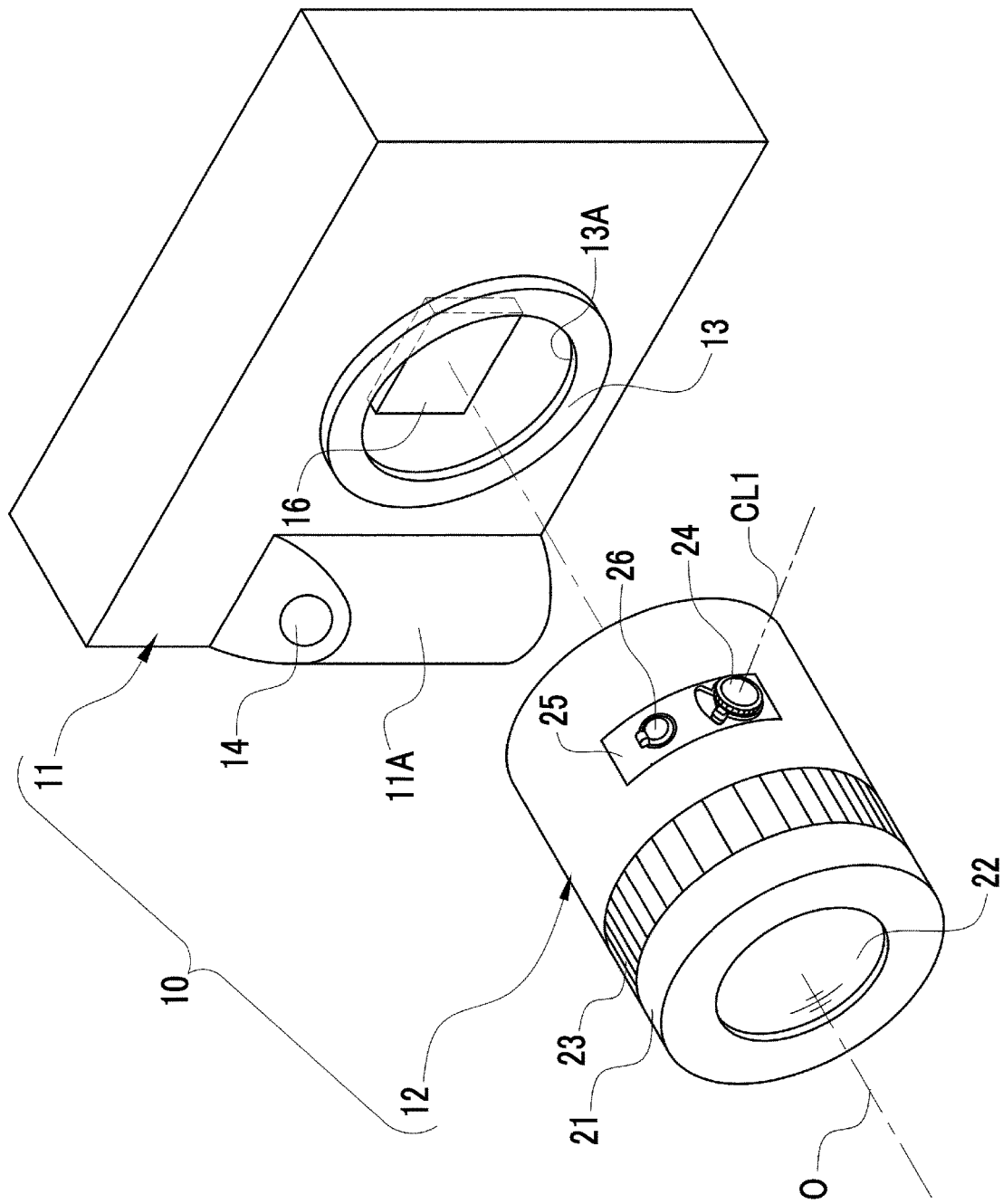

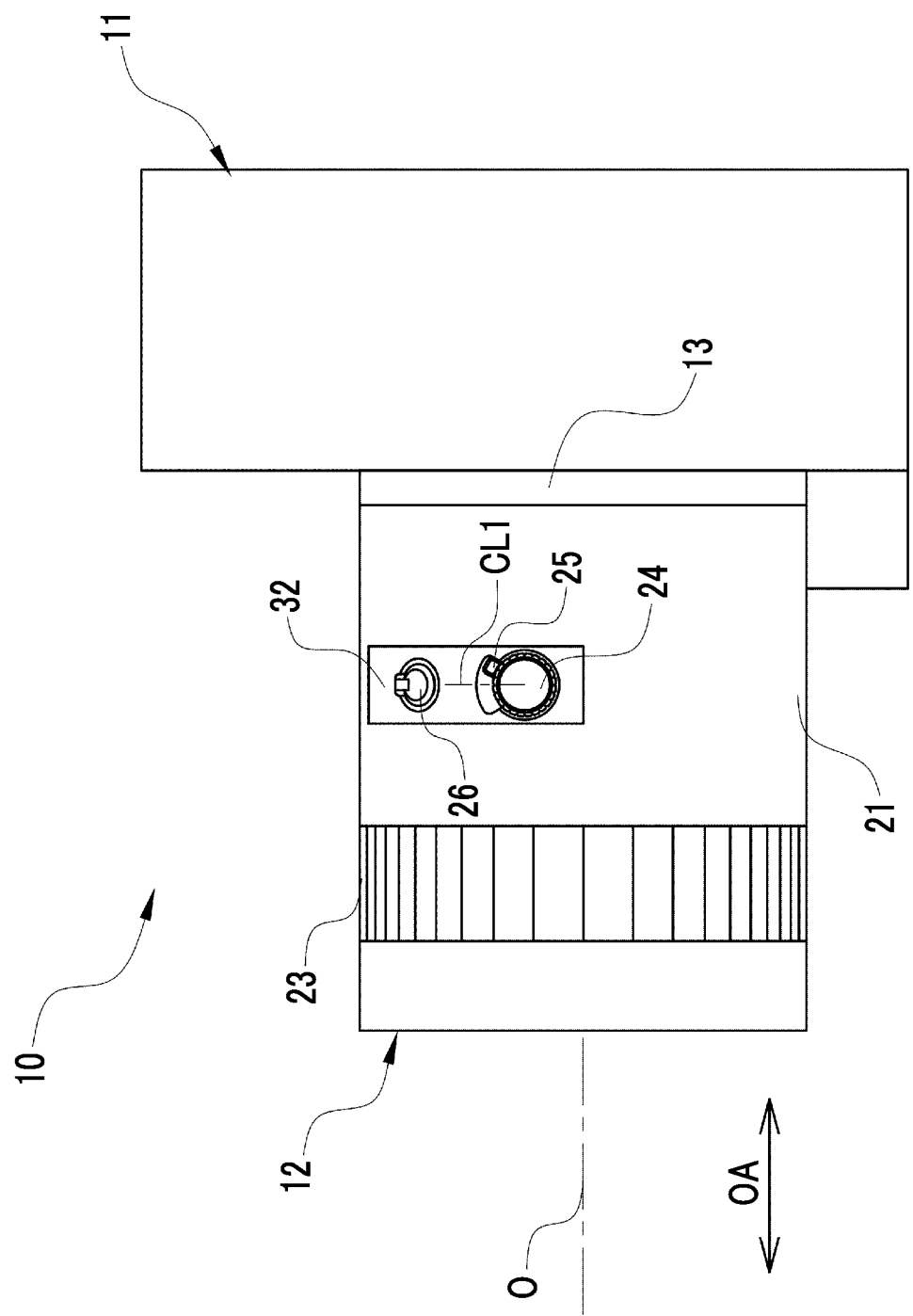

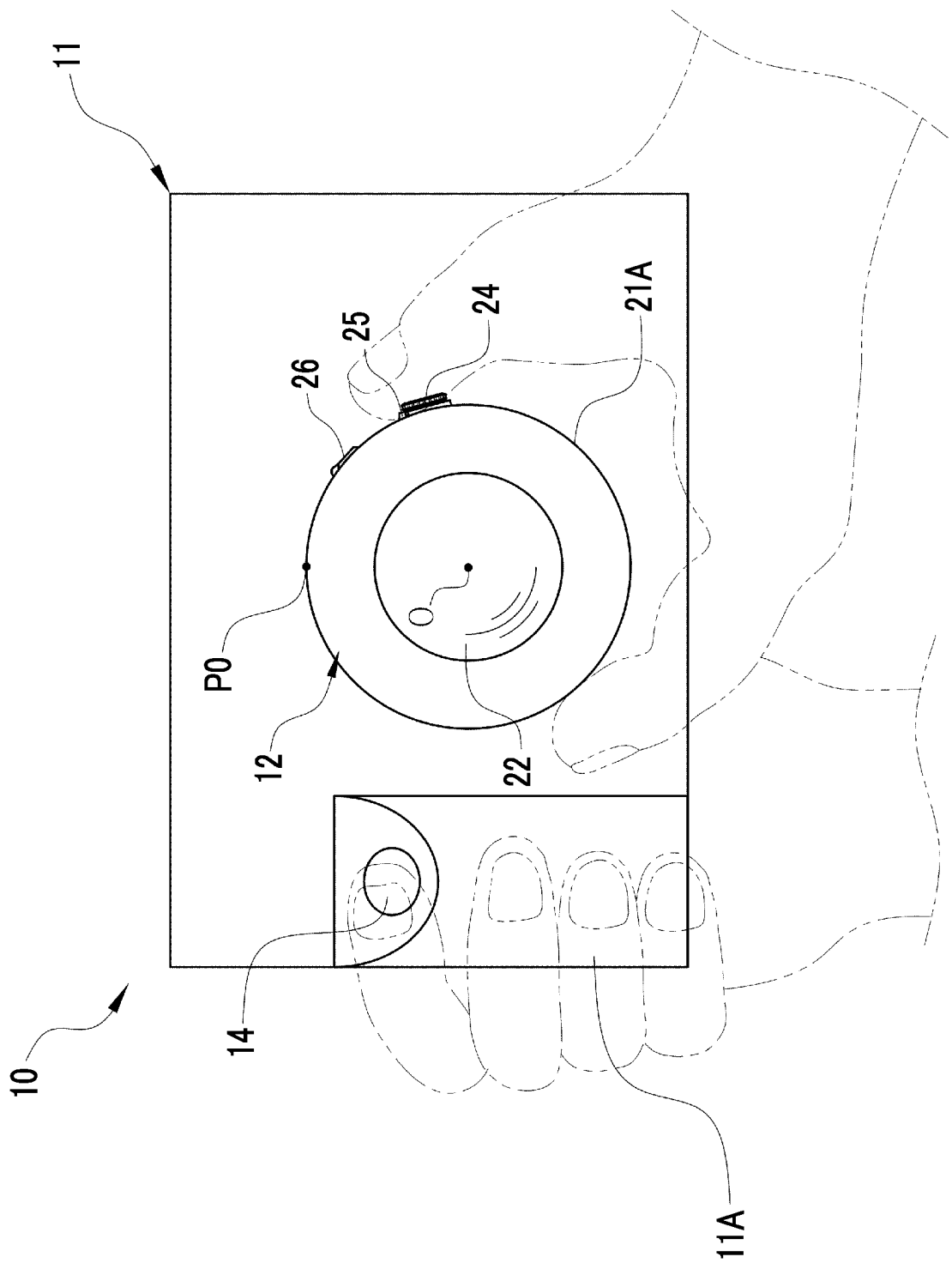

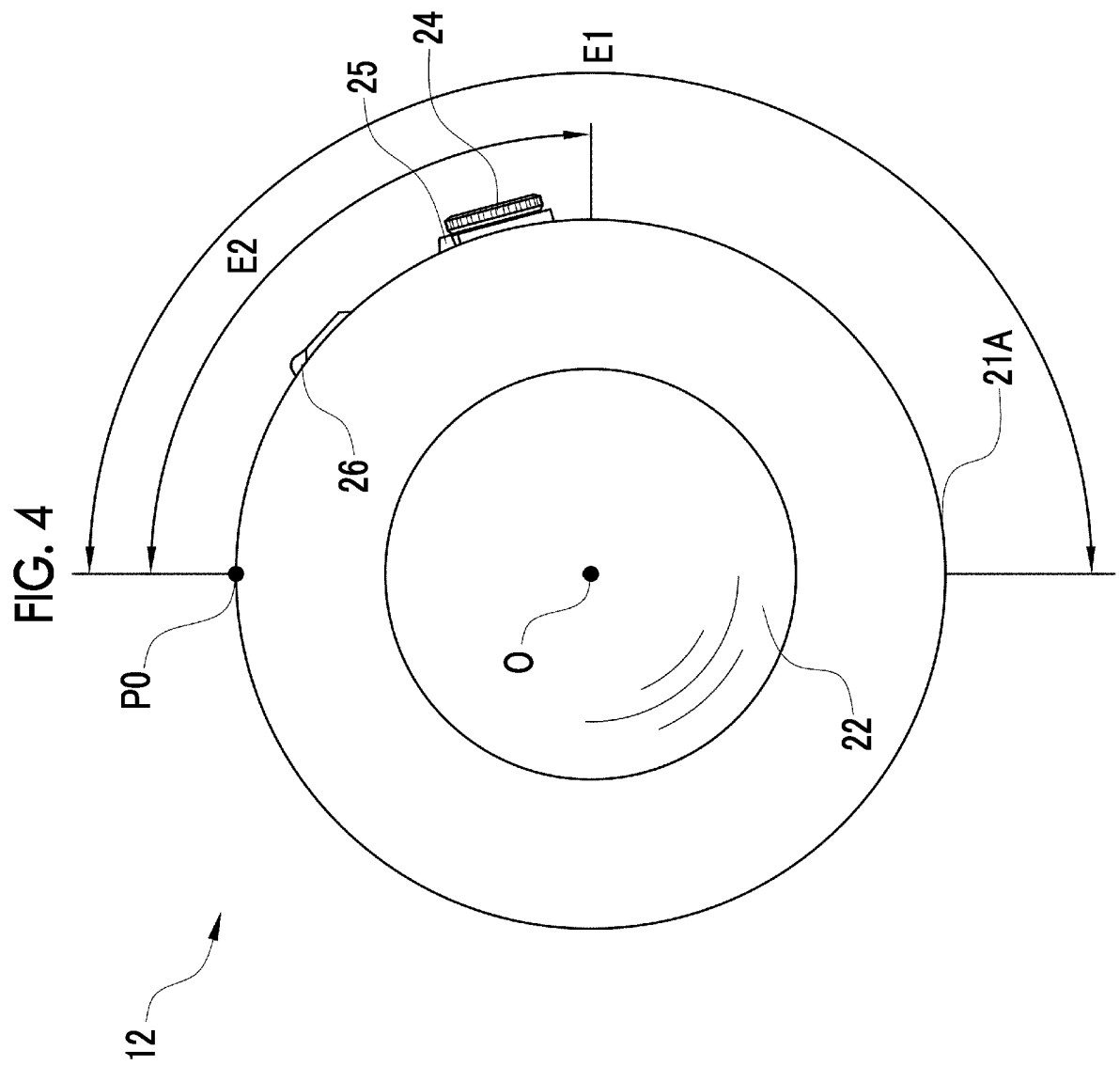

LENS BARREL AND IMAGING DEVICE

CROSS-REFERENCE TO RELATED APPLICATIONS

This application claims priority under 35 U.S.C § 119(a) to Japanese Patent Application No. 2021-084011 filed on 18 May 2021. The above application is hereby expressly incorporated by reference, in its entirety, into the present application.

BACKGROUND OF THE INVENTION

1. Field of the Invention

The present invention relates to a lens barrel and an imaging device.

2. Description of the Related Art

JP2016-157029A describes a zoom lock mechanism that fixes a rotation position of a zoom operation ring. In the zoom lock mechanism, an operation knob is operated at a predetermined position to cause two holding members to sandwich a flange portion provided on the zoom operation ring, and thus the zoom operation ring can be fixed and held.

JP1997-15481A (JP-H9-15481A) describes an auto/manual switching device for an imaging lens having an auto-drive system and a manual drive system that move a lens group in an optical axis direction for focus adjustment and zoom adjustment. The auto/manual switching device comprises an operation member provided reciprocatably from the outside to the inside of an outer peripheral surface of a fixed lens barrel and an interlocking mechanism in which the automatic drive system and the manual drive system are alternately switched to an operating state in interlocking with the reciprocating movement of the operation member.

SUMMARY OF THE INVENTION

One embodiment according to the technique of the present disclosure provides a lens barrel and an imaging device capable of suppressing an operation sound in a case where an operation member is put into a restriction state.

A lens barrel according to an aspect of the present disclosure comprises a lens barrel main body, an operation member, a first member, and a second member. The lens barrel main body holds an optical system. The operation member is provided around the lens barrel main body and adjusts an optical function of the optical system. The first member is provided movably between a restriction position and a release position and has a first inclined surface inclined with respect to a movement direction from the release position toward the restriction position. The second member is provided between the first member and the operation member and has a second inclined surface.

The first member preferably includes the first inclined surface and has a tapered cross-sectional shape in a thickness direction intersecting the movement direction. The second member preferably includes the second inclined surface and has the tapered cross-sectional shape in the thickness direction.

The first inclined surface preferably engages with the second inclined surface. The second inclined surface is preferably disposed at a position facing the first member.

In a case where the first member moves to the release position, the operation member is preferably put into a release state. The second member preferably puts the operation member into a restriction state in a case where the first member is in the restriction position.

The second member preferably receives pressure from the first member in a case where the first member is in the restriction position. The operation member is preferably in the restriction state where movement is restricted by receiving pressure from the first member via the second member in a case where the first member is in the restriction position. The second member preferably puts the operation member into the restriction state by frictionally locking the operation member and puts the operation member into a release state in a case where pressure from the first member is released.

The first member preferably has a first thick portion and a first thin portion having a smaller dimension in a thickness direction intersecting the movement direction than the first thick portion. The second member preferably has a second thick portion and a second thin portion having a smaller dimension in the thickness direction than the second thick portion. The first member preferably presses the second member toward the operation member with the first thick portion and the second thick portion in contact with each other in a case where the first member moves to the restriction position.

The first member preferably releases pressure on the second member with the first thick portion and the second thin portion facing each other and the second thick portion and the first thin portion facing each other in a case where the first member is moved to the release position. The second member is preferably separated from the operation member with the release of the pressure from the first member.

The operation member preferably faces a tangent surface in tangent contact with an outer peripheral surface of the lens barrel main body or a mounting surface which is a surface recessed from the outer peripheral surface. The operation member is preferably a rotating member that rotates within the tangent surface. The operation member is preferably a rotating member that rotates around a rotational axis orthogonal to the mounting surface.

The first member is preferably provided coaxially with the operation member and rotatably between the restriction position and the release position. One of the second member and the lens barrel main body preferably has a recessed portion extending in a direction parallel to the rotational axis. The other of the second member and the lens barrel main body preferably has a projected portion that slidably fits with the recessed portion.

A plurality of the first inclined surfaces are preferably provided on the first member. The second inclined surface is preferably provided on the second member in the same number as the first inclined surface.

The first inclined surfaces are preferably provided around the rotational axis at equal angular spacings. The second inclined surfaces are preferably provided around the rotational axis at the equal angular spacings. The first inclined surface and the second inclined surface are preferably disposed around the rotational axis at a spacing of 180°.

The operation member preferably faces the tangent surface in tangent contact with the outer peripheral surface of the lens barrel main body or the mounting surface which is a surface recessed from the outer peripheral surface. The first member is preferably a slide member that slides between the release position and the restriction position.

The operation member is preferably a pressing button that faces the tangent surface in tangent contact with the outer peripheral surface of the lens barrel main body or the mounting surface which is a surface recessed from the outer peripheral surface and moves forward and backward along a mounting shaft intersecting the tangent surface or the mounting surface.

The lens barrel is preferably detachable from and attachable to a camera main body. The operation member and the first member are preferably provided around the lens barrel on a side opposite to a grip portion of the camera main body. In a case where an upper position around the lens barrel in a vertical direction is a reference position, a camera main body side of the lens barrel in an optical axis direction of the optical system is a rear surface side, and a subject side opposite to the camera main body side is a front surface side, the operation member and the first member are preferably provided on a left-side surface side around the lens barrel with the reference position as a base point. The operation member and the first member are preferably disposed within a range of 0° to 90° around an optical axis of the optical system with the reference position as a base point.

An imaging device of the present invention comprises the lens barrel described above and a camera main body.

The imaging device further comprises a processor that switches a function to be executed in response to an operation by the operation member. The processor preferably performs, in a case where the lens barrel is attached to the camera main body, control of operating the camera main body, instead of adjusting the optical function, in response to the operation by the operation member.

BRIEF DESCRIPTION OF THE DRAWINGS

FIG. 1 is an exploded perspective view of a digital camera.

FIG. 2 is a side view of the digital camera.

FIG. 3 is a front view of a digital camera.

FIG. 4 is a front view of a lens barrel.

DESCRIPTION OF THE PREFERRED EMBODIMENTS

First Embodiment

Figure 5A:
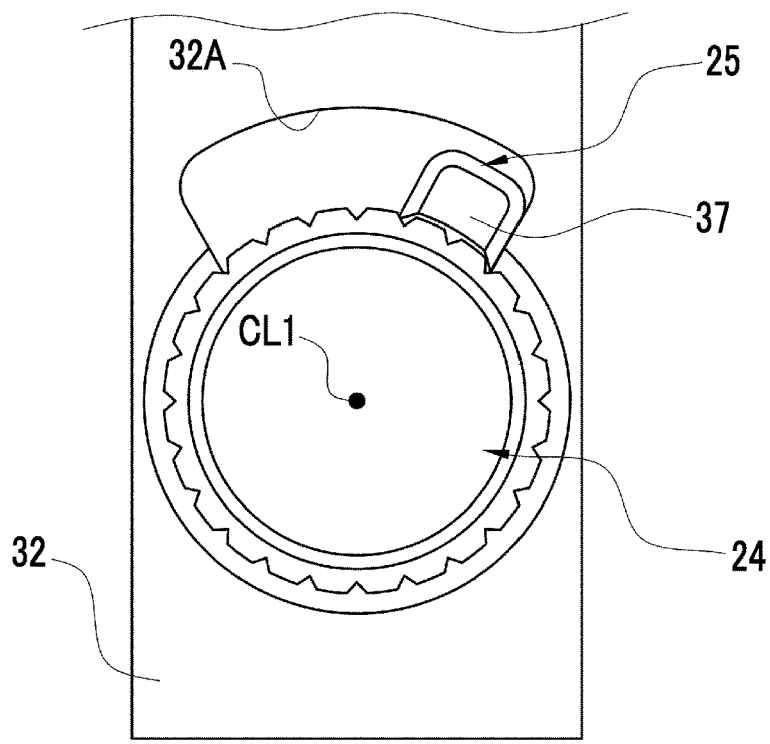
FIGS. 5A and 5B are enlarged views of an operation member and a periphery of a first member and are enlarged views of a release position (FIG. 5A) and a restriction position (FIG. 5B) of the first member.

As shown in FIG. 1, a digital camera 10 comprises a camera body 11 and an interchangeable lens barrel 12. The camera body 11 corresponds to a camera main body within the scope of the claims. A lens mount 13, a release switch 14, a power switch (not shown), and the like are provided on a front surface of the camera body 11. The lens mount 13 has a circular imaging aperture 13A. The lens barrel 12 is detachable from and attachable to the lens mount 13. The digital camera 10 is an example of an imaging device according to the present invention.

An imaging element 16 is built in the camera body 11. The imaging element 16 is, for example, a complementary metal oxide semiconductor (CMOS) image sensor, a charge coupled device (CCD) image sensor, or an organic thin-film imaging element. The lens mount 13 is provided with a body-side signal contact 17 (refer to FIG. 10) for electrically connecting to and communicating with the lens barrel 12 inside the imaging aperture 13A. The camera body 11 has a grip portion 11A that bulges forward from a left side (right side with respect to user gripping camera body 11) in a front view.

As shown in FIG. 2, the lens barrel 12 comprises a lens barrel main body 21, an imaging optical system 22, a focus ring 23, a dial operation member 24, a restriction operation member 25, and a mode switching operation member 26. The lens barrel main body 21 has a cylindrical shape and holds an imaging optical system 22 inside, and is provided with a lens mount 27 and a lens-side signal contact 28 (refer to FIG. 14) at a rear end. In a case where the lens barrel 12 is attached to the camera body 11, the imaging optical system 22 forms a subject light on the imaging element 16.

On an outer periphery of the lens barrel main body 21, the focus ring 23 is rotatably provided around an optical axis O of the imaging optical system 22. With manual rotating operation by an imager, the focus ring 23 allows a focus lens 22a, which will be described below, to be moved to adjust the focus of the imaging optical system 22.

The dial operation member 24 is provided around the lens barrel main body 21, and specifically, is provided on an outer peripheral surface of the lens barrel main body 21. The dial operation member 24 corresponds to an operation member and a rotating member within the scope of the claims. The dial operation member 24 is rotatably supported around a rotational axis CL1 intersecting the optical axis O of the imaging optical system 22. The rotational axis CL1 is preferably orthogonal to the optical axis O. The dial operation member 24 adjusts a shutter speed as an optical function of the imaging optical system 22. Specific examples of adjusting the optical function including the shutter speed will be described below.

The mode switching operation member 26 is provided around the lens barrel main body 21, and specifically, is provided on the outer peripheral surface of the lens barrel main body 21. The mode switching operation member 26 is a mode switching switch that switches to any one of a plurality of modes selected by a user. The mode switching operation member 26 is a rotating member that is rotatably supported around a rotational axis different from the rotational axis CL1.

As shown in FIG. 3, the dial operation member 24 and the restriction operation member 25 are provided around the lens barrel 12 on an opposite side of the grip portion 11A of the camera body 11. More specifically, as shown in FIG. 4, in a case where an upper position around the lens barrel main body 21 in a vertical direction is a reference position P0, a camera body 11 side of the lens barrel main body 21 in an optical axis direction OA is a rear surface side, and a subject side opposite to the camera body 11 side is a front surface side, the dial operation member 24 and the restriction operation member 25 are preferably provided within a range E1 on a left-side surface side around the lens barrel main body 21 with the reference position P0 as a base point.

In this case, the camera body 11 is assumed to be gripped by the user's right hand and the lens barrel 12 is assumed to be gripped by the user's left hand. Accordingly, the user can easily operate the dial operation member 24 and the restriction operation member 25 using only a finger of the left hand (for example, thumb). The dial operation member 24 and the restriction operation member 25 are more preferably disposed within a range E2 of 0° to 90° around the optical axis O of the imaging optical system 22 with the reference position P0 as a base point.

Figure 5B:
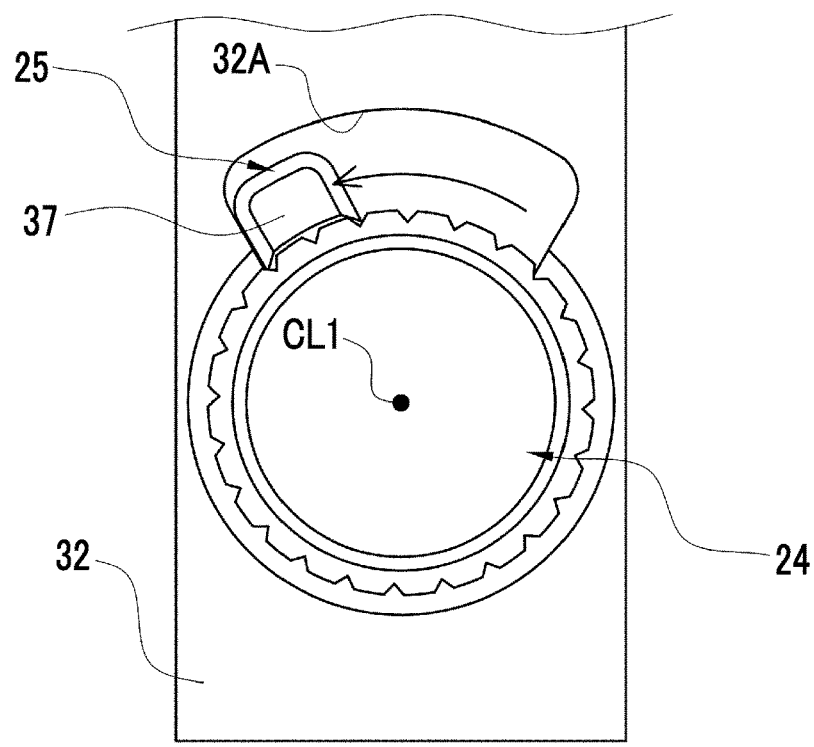

The restriction operation member 25 constitutes a restriction mechanism 29 described below. The restriction operation member 25 corresponds to a first member within the scope of the claims. The restriction operation member 25 is rotatably provided between a release position (position shown in FIG. 5A) and a restriction position (position shown in FIG. 5B) around the rotational axis CL1 of the dial operation member 24. A difference between the "restriction position" and the "release position" includes not only a case where a position of the first member in three dimensions is different, but also a case where only rotation positions of the "restriction position" and the "release position" are different as in the dial operation member 24 according to the present embodiment. With the rotation of the restriction operation member 25, a restriction state where the dial operation member 24 is restricted and a release state where the restriction state is released can be switched. That is, in a case where the restriction operation member 25 is in the restriction position, the restriction mechanism 29 is in the restriction state where the dial operation member 24 is restricted. In a case where the restriction operation member 25 is in the release position, the restriction mechanism 29 is in the release state where the restriction state is released and the rotation of the dial operation member 24 is allowed. The term "restriction" means that the dial operation member 24 is pressed by the restriction operation member 25 via a cam member 33 described below.

Figure 6:
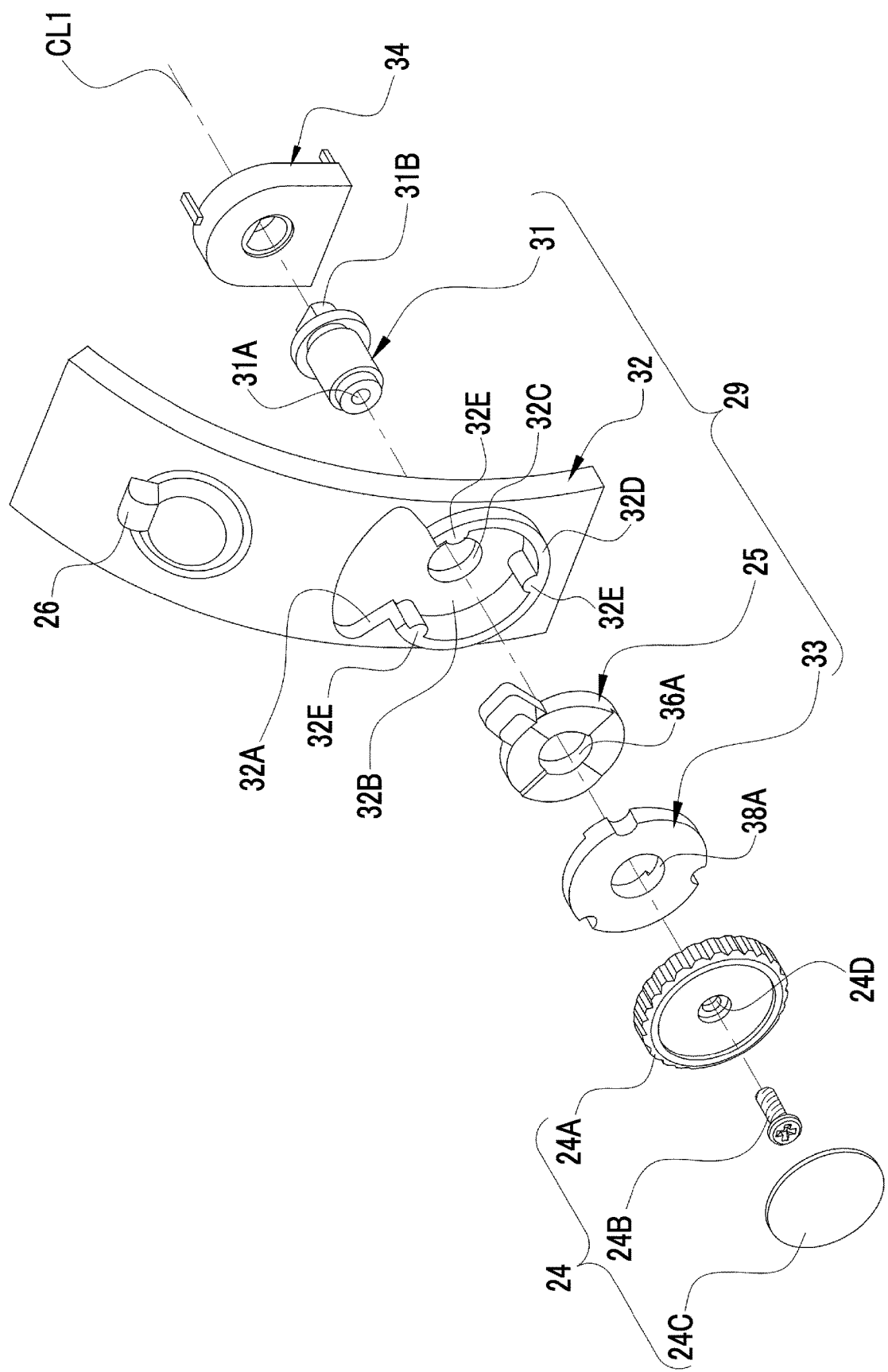
FIG. 6 is an exploded perspective view of the operation member and a restriction mechanism.

As shown in FIG. 6, the dial operation member 24 is configured of an operation member main body 24A, a male screw 24B, and a blindfold member 24C. The operation member main body 24A has a female screw hole 24D in the center. The dial operation member 24 is mounted to a mounting piece 32 via a shaft member 31. The mounting piece 32 is, for example, fixed by screwing to form a part of the lens barrel main body 21.

The restriction mechanism 29 comprises the restriction operation member 25, the shaft member 31, the mounting piece 32, and the cam member 33. The mounting piece 32 is formed in an arc shape continuous with an outer peripheral surface 21A (refer to FIGS. 3 and 4) of the lens barrel main body 21. The mounting piece 32 has a recessed portion 32A, a mounting surface 32B, a through-hole 32C, a ridge portion 32D, and a key protrusion 32E. The key protrusion 32E corresponds to a projected portion within the scope of the claims.

The recessed portion 32A is a portion recessed with respect to the outer peripheral surface 21A. The restriction operation member 25 is disposed inside the recessed portion 32A. The mounting surface 32B is a flat surface that is formed inside the recessed portion 32A and recessed from the outer peripheral surface 21A, and is a surface orthogonal to the rotational axis CL1.

The through-hole 32C is a circular through-hole that penetrates the mounting piece 32. The through-hole 32C communicates with the mounting surface 32B. The ridge portion 32D is formed in an arc shape along the periphery of the mounting surface 32B and projects radially outward with respect to the outer peripheral surface 21A.

A plurality of key protrusions 32E are provided on an inner peripheral surface of the ridge portion 32D. The key protrusion 32E extends in a direction parallel to the rotational axis CL1 and fits with a key groove 39 of the cam member 33 described below. In the example shown in FIG. 6, three key protrusions 32E are formed on the inner peripheral surface of the ridge portion 32D and are disposed around the rotational axis CL1 at a spacing of 120°. The key protrusion 32E is located outside the restriction operation member 25 and does not hinder the movement of the restriction operation member 25.

The shaft member 31 is formed in a columnar shape and rotatably fits with the through-hole 32C of the mounting piece 32. A tip-end portion of the shaft member 31 has a female screw hole 31A. The male screw 24B is screwed into the female screw hole 24D in the operation member main body 24A. The male screw 24B is fastened and fixed to the female screw hole 31A of the shaft member 31. Accordingly, the shaft member 31 is coupled to the dial operation member 24. That is, the shaft member 31 rotates integrally with the dial operation member 24. For example, the blindfold member 24C is attached to a tip-end surface of the operation member main body 24A by applying an adhesive. Accordingly, the male screw 24B is covered by the blindfold member 24C.

A base-end portion 31B of the shaft member 31 is formed in a D-cut shape. The base-end portion 31B is connected to a rotation amount detection sensor 34 located inside the lens barrel main body 21. The rotation amount detection sensor 34 is a well-known optical or contact type sensor or the like and detects a rotation amount of the dial operation member 24 via the shaft member 31. The rotation amount detection sensor 34 is mounted to the inside of the lens barrel main body 21 via a substrate (not shown) or the like. The shaft member 31 is restricted from moving along the rotational axis CL1.

The restriction operation member 25 is disposed inside the recessed portion 32A and at a position facing the mounting surface 32B. The restriction operation member 25 has a first cam portion 36 and a finger hook portion 37. In a case where the restriction operation member 25 is operated, the user puts the user's finger on the finger hook portion 37 to rotate the restriction operation member 25. The first cam portion 36 is formed in a disk shape having an outer diameter smaller than that of the dial operation member 24. A through-hole 36A is formed in a center of the first cam portion 36. The through-hole 36A fits with the shaft member 31. Accordingly, the restriction operation member 25 is rotatably supported around the rotational axis CL1. That is, the restriction operation member 25 is provided coaxially with the dial operation member 24. In the following, a direction in which the restriction operation member 25 moves from the release position to the restriction position is referred to as a movement direction R1, and a direction in which the restriction operation member 25 moves from the restriction position to the release position is referred to as a movement direction R2.

The finger hook portion 37 moves inside the recessed portion 32A with the rotation of the restriction operation member 25. In a case where the restriction operation member 25 is in the release position (position shown in FIG. 5A) and the restriction position (position shown in FIG. 5B), the finger hook portion 37 is in contact with an end portion of the recessed portion 32A. Accordingly, the restriction operation member 25 is rotatable between the release position and the restriction position around the rotational axis CL1.

Figure 7:
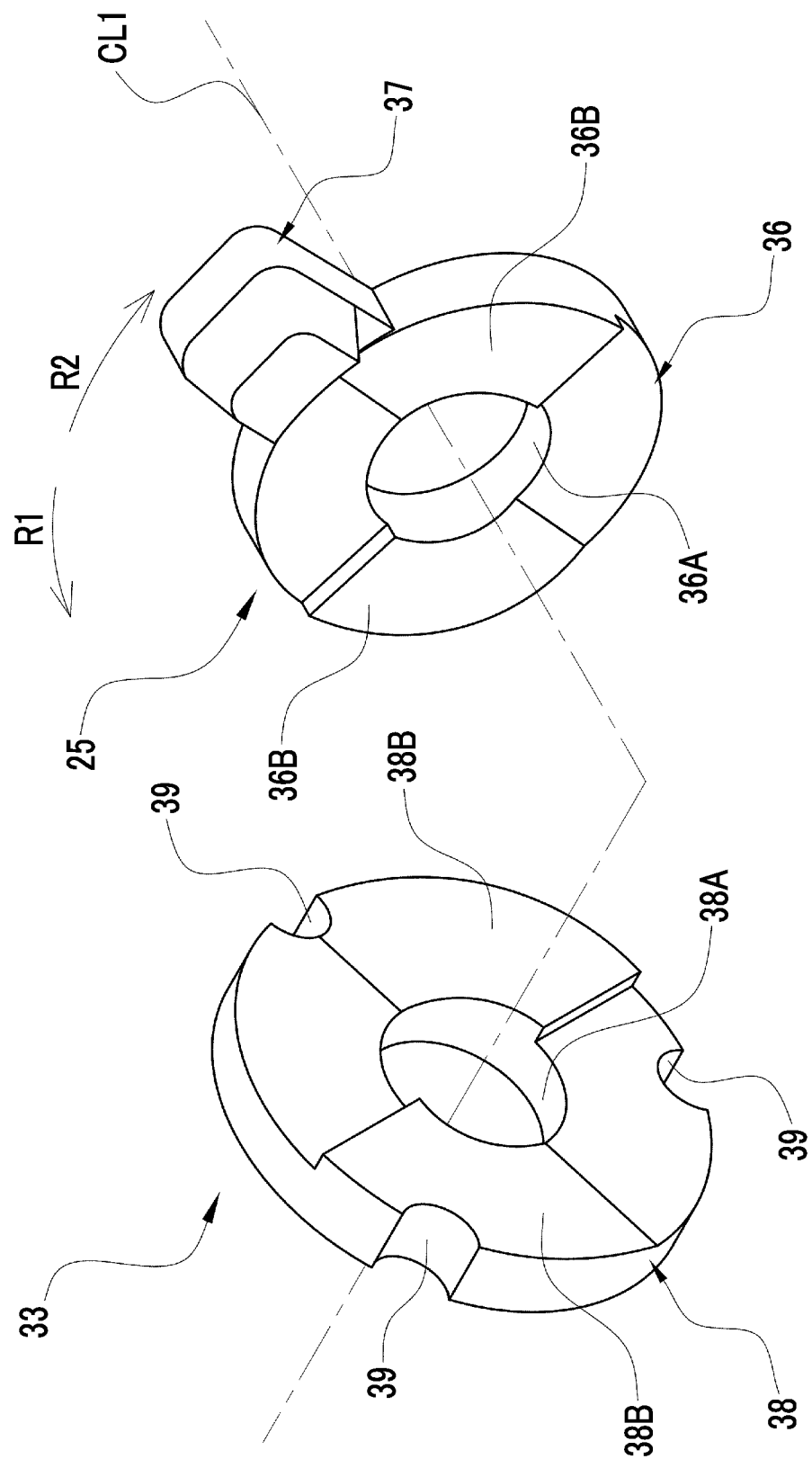
FIG. 7 is a perspective view of the first member and a second member.

As shown in FIG. 7, the first cam portion 36 has two first inclined surfaces 36B. The first inclined surface 36B is an inclined surface that is inclined with respect to the movement direction RE The first inclined surface 36B is provided around the rotational axis CL1 at a spacing of 180°. The number and disposition of the first inclined surfaces 36B are not limited thereto. A plurality of the first inclined surfaces 36B are preferably provided on the first cam portion 36 and disposed around the rotational axis CL1 at equal angular spacings.

Figure 8:
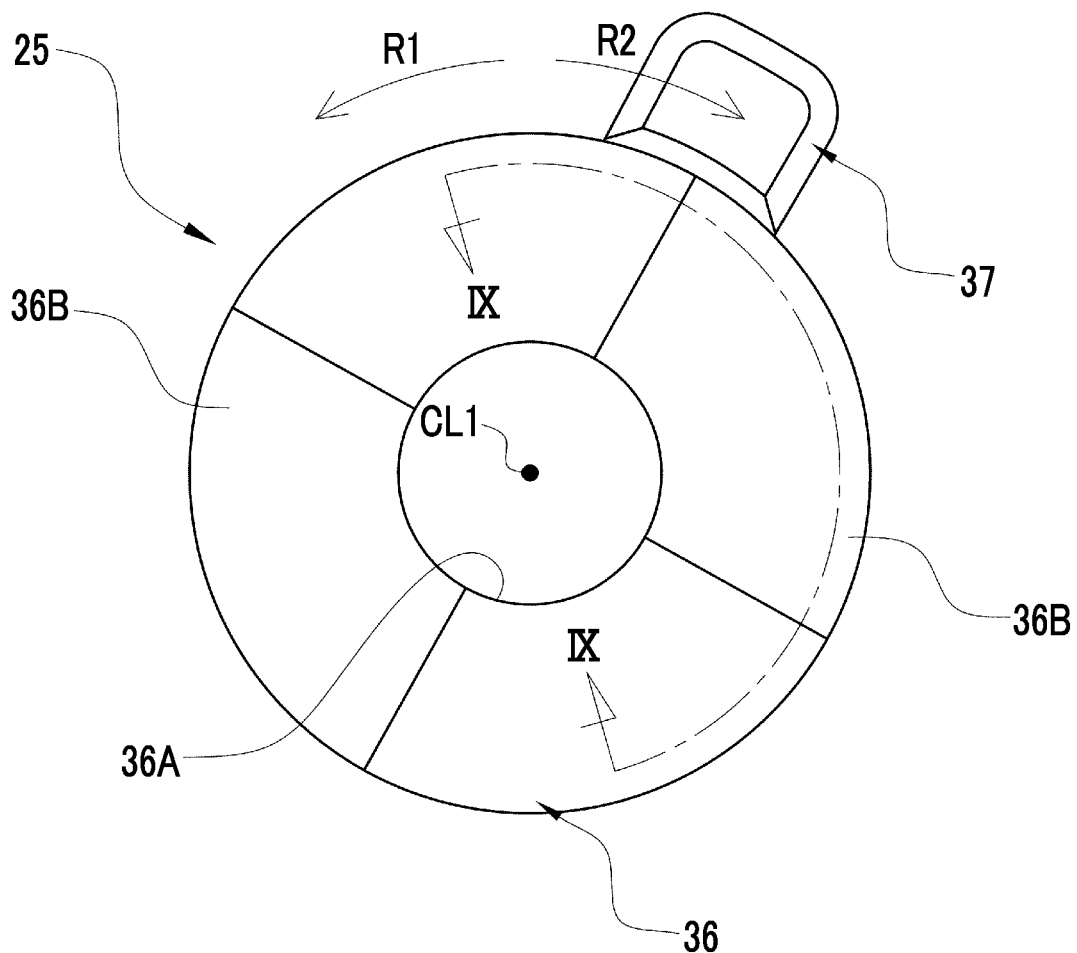
FIG. 8 is a front view of the first member.
Figure 9:
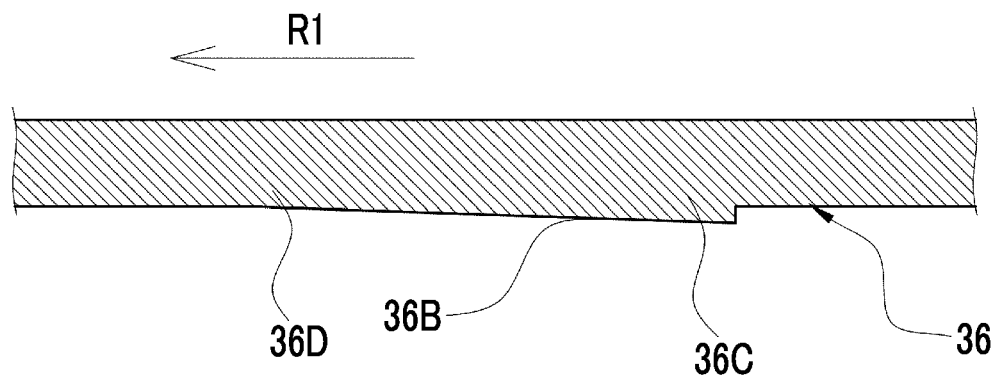
FIG. 9 is a cross-sectional view of a main part cut along a line IX-IX of FIG. 8.

As shown in FIGS. 8 and 9, the first cam portion 36 includes the first inclined surface 36B and has a tapered cross-sectional shape in the thickness direction. More specifically, the first cam portion 36 has the tapered shape in which a dimension of a portion including the first inclined surface 36B in the thickness direction gradually decreases toward the movement direction RE The thickness direction referred to here is a direction orthogonal to the movement direction R1 and parallel to the rotational axis CL1. As described above, the first cam portion 36 is tapered. Therefore, the first cam portion 36 has a first thick portion 36C and a first thin portion 36D having a smaller dimension in the thickness direction than the first thick portion 36C.

The cam member 33 corresponds to a second member within the scope of the claims. The cam member 33 is provided between the restriction operation member 25 and the dial operation member 24. The cam member 33 has a second cam portion 38 and the key groove 39. The key groove 39 corresponds to a recessed portion within the scope of the claims. The second cam portion 38 is formed in a disk shape having an outer diameter smaller than that of the dial operation member 24. A through-hole 38A is formed in a center of the second cam portion 38. The through-hole 38A fits with the shaft member 31. The number of key grooves 39 is formed on an outer peripheral surface of the second cam portion 38 in the same number as the key protrusions 32E and extends in the direction parallel to the rotational axis CL1. In the example shown in FIG. 6, three key grooves 39 are formed on the outer peripheral surface of the second cam portion 38 and are disposed around the rotational axis CL1 at a spacing of 120°.

As shown in FIG. 7, the second cam portion 38 has two second inclined surfaces 38B. The second inclined surface 38B is an inclined surface that is disposed at a position facing the restriction operation member 25 and is inclined with respect to the movement direction RE The second inclined surface 38B is provided around the rotational axis CL1 at a spacing of 180°. The number and disposition of the second inclined surfaces 38B are not limited thereto. For example, the second inclined surfaces 38B are preferably provided in the same number as the first inclined surfaces 36B and disposed around the rotational axis CL1 at the equal angular spacings.

Figure 10:
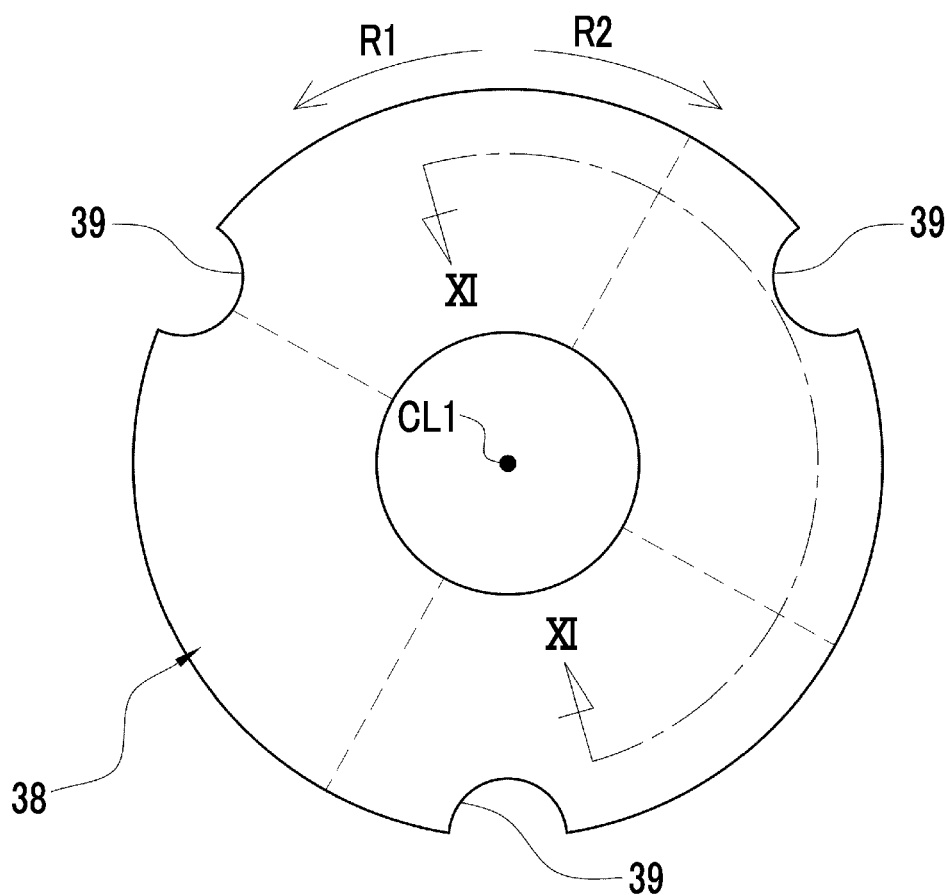
FIG. 10 is a front view of the second member.
Figure 11:
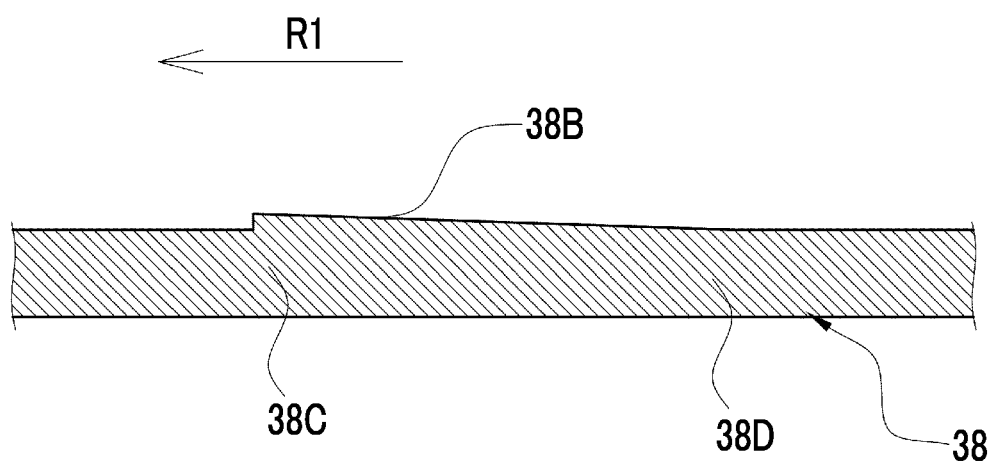
FIG. 11 is a cross-sectional view of a main part cut along a line XI-XI of FIG. 10.

As shown in FIGS. 10 and 11, the second cam portion 38 includes the second inclined surface 38B and has a tapered cross-sectional shape in the thickness direction. More specifically, the second cam portion 38 has the tapered shape in which a dimension of a portion including the second inclined surface 38B in the thickness direction gradually increases toward the movement direction RE As described above, the second cam portion 38 has the tapered cross-sectional shape in the thickness direction. Therefore, the second cam portion 38 has a second thick portion 38C and a second thin portion 38D having a smaller dimension in the thickness direction than the second thick portion 38C.

The key protrusion 32E is slidably fitted with the key groove 39. Accordingly, the cam member 33 is restricted from rotating around the rotational axis CL1 and is slidably mounted along the rotational axis CL1.

Operations of the restriction operation member 25 and the cam member 33 will be described with reference to FIGS. 12 and 13. In a case where the user wants to restrict the rotation of the dial operation member 24, that is, in a case where the user wants to fix the position of the dial operation member 24, in the present embodiment, in a case where the dial operation member 24 is operated to reach the shutter speed desired by the user, the user operates the restriction operation member 25 toward the movement direction R1 to change the dial operation member 24 from the release state to the restriction state. In FIGS. 12A and 12B, the mounting piece 32, the rotation amount detection sensor 34, and the like are not shown for easy understanding of the operations of the restriction operation member 25 and the cam member 33. The operation member main body 24A, the restriction operation member 25, and the cam member 33 are made of a material that causes frictional locking on contact surfaces with each other in a case where the operation member main body 24A, the restriction operation member 25, and the cam member 33 receive pressure and are in contact with each other. For example, the operation member main body 24A and the restriction operation member 25 are preferably made of a polycarbonate resin, and the cam member 33 is preferably made of a polyoxymethylene resin. Not limited thereto, any material such as a metal material or a resin material that causes frictional locking may be used.

As described above, the dial operation member 24 is coupled to the shaft member 31 by screwing and is mounted on the mounting piece 32. Therefore, the dial operation member 24 is held at a constant spacing L0 from the mounting surface 32B. The spacing L0 is a dimension in the thickness direction, that is, in the direction parallel to the rotational axis CL1.

Figure 12A:
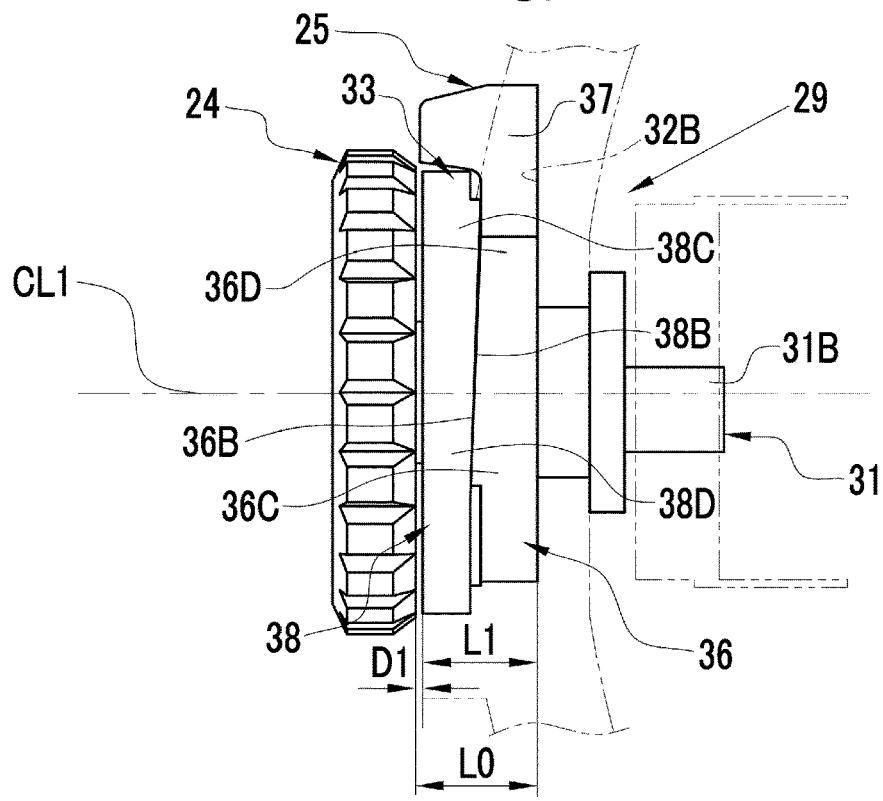
FIGS. 12A and 12B are diagrams for describing operations of the first member and the second member, omitting a mounting piece and the like, and are external views of a release state (FIG. 12A) and a restriction state (FIG. 12B).
Figure 13A:
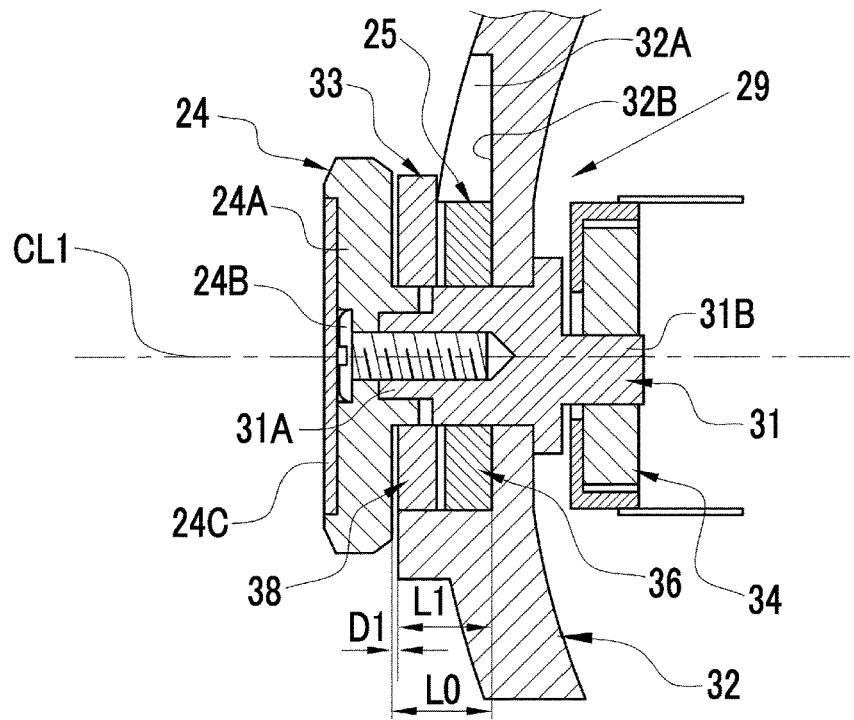
FIGS. 13A and 13B are diagrams for describing the operations of the first member and the second member and are cross-sectional views of a main part showing a release state (FIG. 13A) and a restriction state (FIG. 13B).

As shown in FIGS. 12A and 13A, in a case where the restriction operation member 25 is in the release position, the first thick portion 36C faces the second thin portion 38D, and the second thick portion 38C faces the first thin portion 36D. Therefore, a dimension L1 in the thickness direction (refer to FIG. 12A), which is obtained by adding the restriction operation member 25 and the cam member 33, is smaller than the spacing L0. Accordingly, the restriction operation member 25 is in a state where the pressure on the cam member 33 is released. With the release of the pressure from the restriction operation member 25, the cam member 33 is separated from the dial operation member 24. That is, since the dimension L1 in the thickness direction, which is obtained by adding the restriction operation member 25 and the cam member 33, is smaller than the spacing L0, the cam member 33 has a gap D1 with the dial operation member 24. Accordingly, the dial operation member 24 is rotatable without being frictionally locked by the cam member 33.

Figure 12B:
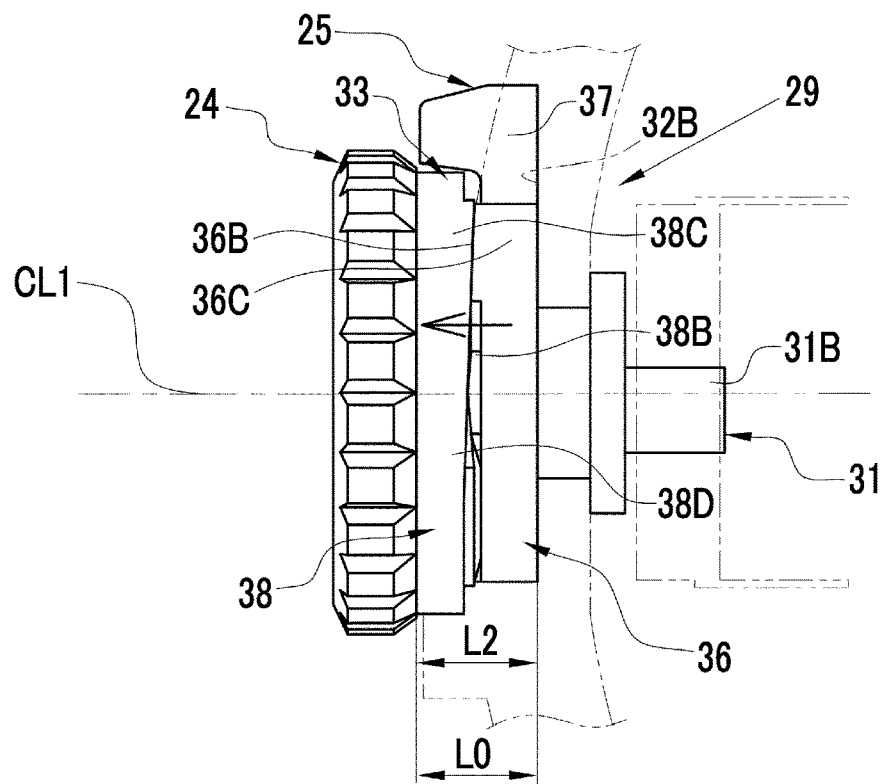
Figure 13B:
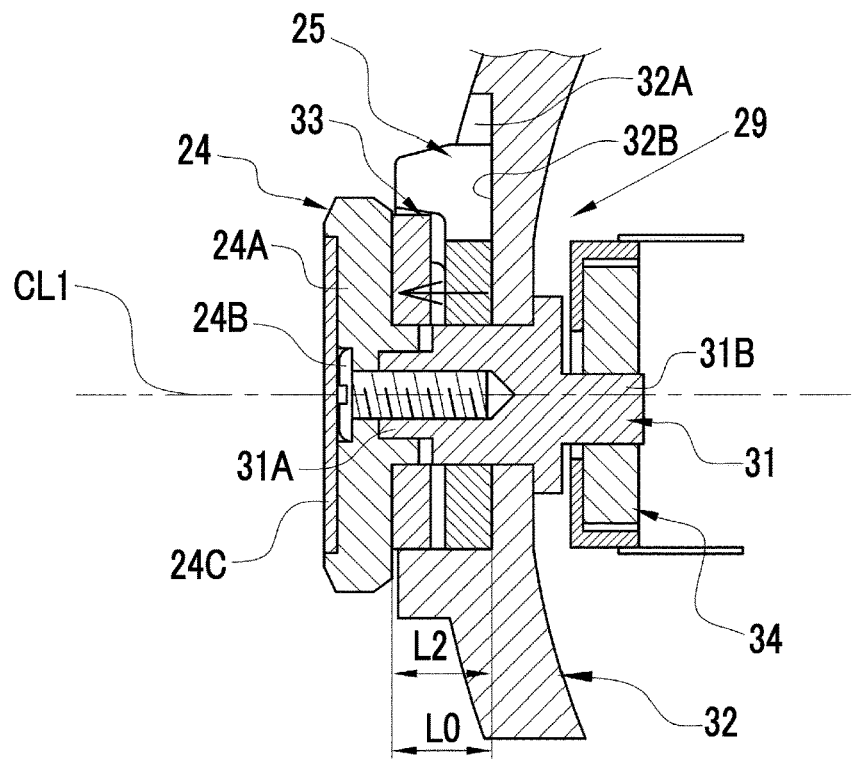

On the other hand, as shown in FIGS. 12B and 13B, in a case where the restriction operation member 25 moves to the restriction position, the first thick portion 36C and the second thick portion 38C come into contact with each other. In this case, the cam member 33 receives the pressure from the restriction operation member 25 and moves to a side of the dial operation member 24. That is, with the reception of pressure from the restriction operation member 25 against the dial operation member 24, the first inclined surface 36B and the second inclined surface 38B are in an engaged state.

With the contact between the first thick portion 36C and the second thick portion 38C, a dimension L2 in the thickness direction (refer to FIG. 12B), which is obtained by adding the restriction operation member 25 and the cam member 33, becomes the spacing L0 or more, as compared with the case where the restriction operation member 25 is in the release position. Accordingly, a gap between the cam member 33 and the dial operation member 24 is eliminated. Therefore, the dial operation member 24 receives the pressure from the restriction operation member 25 via the cam member 33. That is, the dial operation member 24 is frictionally locked by the cam member 33 and is in the restriction state where the rotation thereof is restricted.

In a case where the user wants to release the restriction of the dial operation member 24, the user operates the restriction operation member 25 toward the movement direction R2 to set the dial operation member 24 from the restriction state to the release state. As shown in FIGS. 12A and 13A, in a case where the restriction operation member 25 is moved to the release position, the cam member 33 is released from the pressure from the restriction operation member 25 as described above. Therefore, the cam member 33 is separated from the dial operation member 24. Accordingly, the dial operation member 24 is rotatable without being frictionally locked by the cam member 33.

Figure 14:
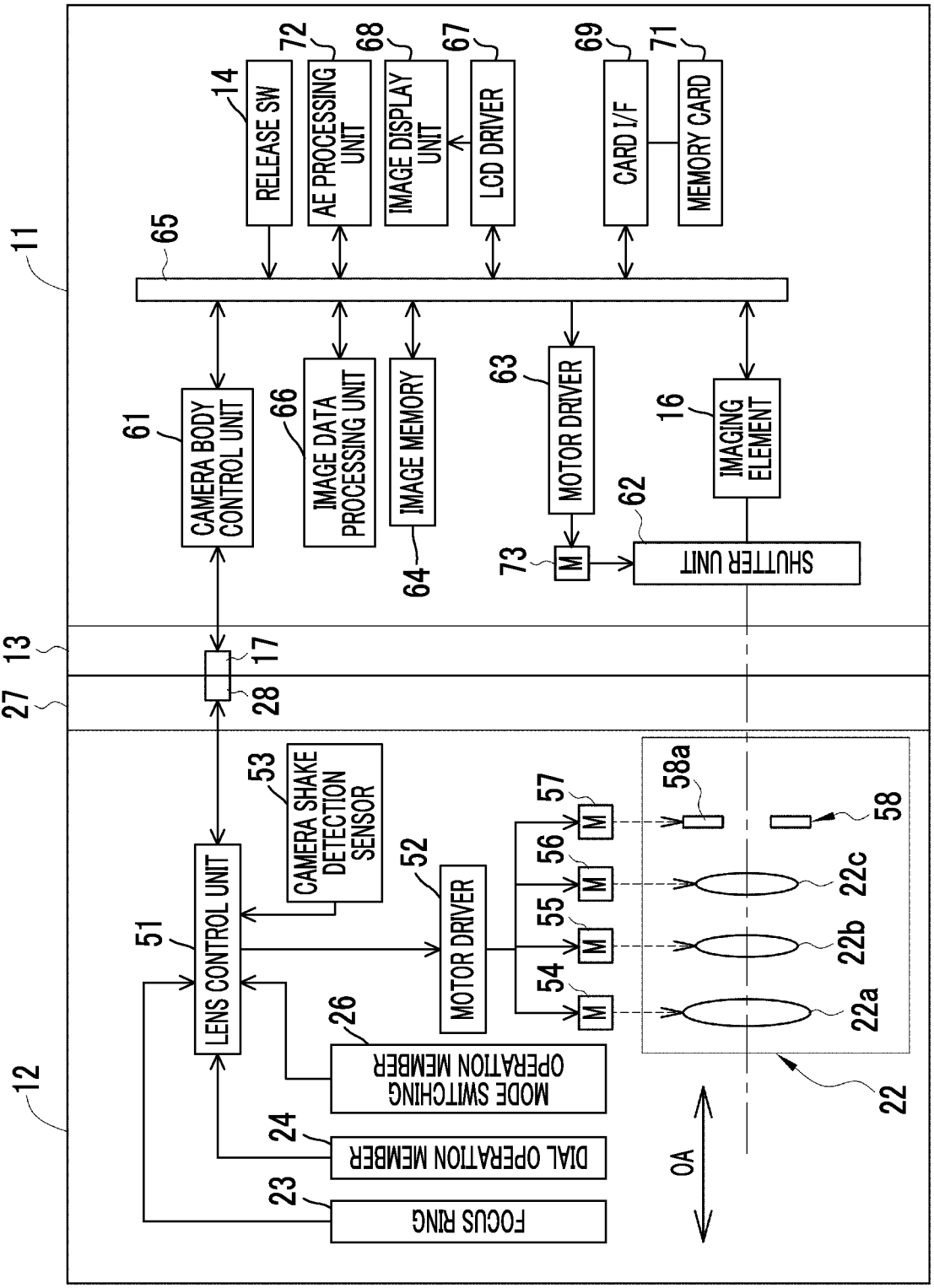
FIG. 14 is a block diagram showing a schematic configuration of the digital camera.

As shown in FIG. 14, the lens barrel 12 comprises a lens control unit 51, a motor driver 52, a camera shake detection sensor 53, motors 54 to 57, and the like, in addition to the imaging optical system 22, the focus ring 23, the dial operation member 24, the mode switching operation member 26, and the like.

The lens control unit 51 is composed of a microcomputer provided with a central processing unit (CPU), a read only memory (ROM) that stores a program and a parameter used by the CPU, a random access memory (RAM) used as a work memory of the CPU (none of which is shown), and the like, and controls each part of the lens barrel 12. The focus ring 23, the dial operation member 24, the mode switching operation member 26, the motor driver 52, and the camera shake detection sensor 53 are connected to the lens control unit 51.

The lens control unit 51 controls a stop unit 58, the focus lens 22a, a zoom lens 22b, and a camera shake correction lens 22c based on signals by operations of the focus ring 23, the dial operation member 24, and the mode switching operation member 26, and a control signal from a camera body control unit 61 described below.

The imaging optical system 22 comprises a plurality of lenses including the focus lens 22a and the zoom lens 22b, the stop unit 58, and the like. The focus lens 22a moves in the optical axis direction OA by being driven by the motor 54 to adjust an imaging distance. The lens control unit 51 transmits, to the motor driver 52, a control signal that moves the focus lens 22a according to a rotation direction and a rotation amount of the focus ring 23 detected based on the signal of a rotation amount detection unit (not shown). The motor driver 52 drives the motor 54 based on the control signal.

The zoom lens 22b constitutes an electric zoom mechanism that moves in the optical axis direction OA by being driven by the motor 55 to change an angle of view of the imaging optical system 22. In this zoom mechanism, for example, a movement amount and a movement direction of the zoom lens 22b are determined according to the operation on the camera body 11 side. The angle of view of the imaging optical system 22 can be changed by the movement of the zoom lens 22b.

The stop unit 58 moves a plurality of stop leaf blades 58a by being driven by the motor 56 to change an amount of light incident on the imaging element 16. The camera shake detection sensor 53 detects a camera shake direction and a camera shake amount of the lens barrel 12. The camera shake direction and the camera shake amount detected by the camera shake detection sensor 53 are output to the lens control unit 51 as a camera shake detection signal. The lens control unit 51 controls the drive of the motor 57 based on the camera shake detection signal to correct a camera shake by moving the camera shake correction lens 22c. The motor driver 52 controls the drive of the motors 54 to 57 based on the control of the lens control unit 51.

The camera body control unit 61 comprises a CPU, a ROM that stores a program and a parameter used by the CPU, a RAM used as a work memory of the CPU (none of which is shown), and the like. The camera body control unit 61 controls each part of the camera body 11 and the lens barrel 12 connected to the camera body 11. A release signal is input to the camera body control unit 61 from the release switch 14. Further, the body-side signal contact 17 is connected to the camera body control unit 61.

The lens-side signal contact 28 contacts the body-side signal contact 17 in a case where the lens mount 27 of the lens barrel 12 is attached to the lens mount 13 of the camera body 11, and electrically connects the lens barrel 12 and the camera body 11.

The shutter unit 62 is a so-called focal plane shutter and is disposed between the lens mount 13 and the imaging element 16. The shutter unit 62 is provided so as to be able to block an optical path between the imaging optical system 22 and the imaging element 16, and changes between an open state and a closed state. The shutter unit 62 is in the open state in a case where a live view image and a video are imaged. The shutter unit 62 temporarily changes from the open state to the closed state at a time of still image imaging. The shutter unit 62 is driven by a shutter motor 73. A motor driver 63 controls the drive of the shutter motor 73.

The imaging element 16 is driven and controlled by the camera body control unit 61. The imaging element 16 has a light-receiving surface composed of a plurality of pixels (not shown) arranged in a two-dimensional matrix. Each pixel includes a photoelectric conversion element and photoelectrically converts a subject image formed on the light-receiving surface by the lens barrel 12 to generate an imaging signal.

The imaging element 16 comprises a signal processing circuit such as a noise reduction circuit, an auto gain controller, and an A/D conversion circuit (none of which is shown). The noise reduction circuit performs noise reduction processing on the imaging signal. The auto gain controller amplifies a level of the imaging signal to an optimum value. The A/D conversion circuit converts the imaging signal into a digital signal and outputs the converted signal from the imaging element 16 to a bus line 65. The output signal of the imaging element 16 is image data (so-called RAW data) having one color signal for each pixel.

An image memory 64 stores image data for one frame output to the bus line 65. An image data processing unit 66 reads out the image data for one frame from the image memory 64 and performs known image processing such as matrix calculation, demosaicing, y correction, luminance/color difference conversion, and resizing processing.

An LCD driver 67 sequentially inputs, to an image display unit 68, the image data for one frame subjected to the image processing by the image data processing unit 66. The image display unit 68 is provided, for example, on a rear surface of the camera body 11 and sequentially displays live view images at constant periods. A card interface (I/F) 69 is incorporated in a card slot (not shown) provided in the camera body 11 and is electrically connected to a memory card 71 inserted in the card slot. The card I/F 69 stores the image data subjected to the image processing by the image data processing unit 66 in the memory card 71. In a case where the image data stored in the memory card 71 is reproduced and displayed, the card I/F 69 reads out the image data from the memory card 71.

The camera body control unit 61 performs the control of moving the focus lens 22*a* on the lens control unit 51 according to the information on the rotation direction and the rotation amount of the focus ring 23 or information on a subject distance measured by an autofocus function.

The camera body control unit 61 operates the stop unit 58 according to exposure information calculated by an automatic exposure (AE) processing unit 72, which will be described below, to transmit a control signal to change a stop diameter to the lens control unit 51. The lens control unit 51 controls the motor driver 52 based on the control signal to change the stop diameter. The lens control unit 51 controls the motor driver 52 based on the control signal to control the stop diameter of the stop unit 58 such that an F number calculated by the AE processing unit 72 can be obtained.

The camera body control unit 61 transmits, to the motor driver 63, a control signal that changes the shutter speed according to the rotation direction and the rotation amount of the dial operation member 24 detected based on the signal of the rotation amount detection sensor 34. The motor driver 63 controls the drive of the shutter motor 73 such that the shutter speed according to the rotation direction and the rotation amount of the dial operation member 24 can be obtained.

The AE processing unit 72 calculates an integrated value of each color signal from the image data for one frame. The camera body control unit 61 calculates an appropriate exposure value based on the integrated value calculated for each image for one frame and determines the F number to obtain the calculated appropriate exposure value for the shutter speed according to the rotation direction and the rotation amount of the dial operation member 24. The camera body control unit 61 transmits the control signal to the lens control unit 51. The lens control unit 51 controls the motor driver 52 based on the control signal to operate the stop unit 58 to the stop diameter at which the determined F number can be obtained.

An operation of the digital camera 10 according to the present embodiment will be described. In a case where the user, who is the imager, operates the power switch (not shown) to turn on power, a power supply voltage is supplied to each part of the digital camera 10. For example, the user operates the mode switching operation member 26 to switch between a video imaging mode and a still image imaging mode.

The user performs the video imaging or the still image imaging while adjusting a focal length, the shutter speed, and the like. As described above, in a case where the user operates the dial operation member 24 to reach a desired shutter speed, the user operates the restriction operation member 25 to put the dial operation member 24 in the restriction state. Accordingly, a set value of the shutter speed does not change without the user's knowledge.

As described above, in the present embodiment, since the restriction operation member 25 and the cam member 33 are provided, the dial operation member 24 is put into the restriction state simply by rotating the restriction operation member 25 from the release position to the restriction position. In this case, the first inclined surface 36B and the second inclined surface 38B are in contact with each other and gradually in the engaged state. As a result, the dial operation member 24 is put into the restriction state, and thus an operation sound is small. Further, since the dial operation member 24 is frictionally locked by the cam member 33 and the rotation thereof is restricted, there is no need to lock the operation member by a click mechanism or the like unlike the lens barrel in the related art. That is, in the lens barrel 12 according to the present embodiment, the operation sound is small in a case where the dial operation member 24 is changed from the release state to the restriction state and from the restriction state to the release state.

The fact that the operation sound is small in a case where the restriction operation member 25 is operated as described above is particularly effective at the time of video imaging. Further, since a push-in type button is not used in a case where the operation member is put into the restriction state unlike the lens barrel in the related art, the optical axis O of the imaging optical system 22 does not move even in a case where the restriction operation member 25 is operated at the time of video imaging. Therefore, a screen can be prevented from shaking at the time of video imaging.

In the lens barrel 12, the restriction mechanism 29 that puts the dial operation member 24 into the restriction state with only a small number of parts such as the restriction operation member 25 and the cam member 33 is caused to operate. Therefore, a height at which the part projects from the outer peripheral surface 21A can be suppressed to be small, which in turn can contribute to miniaturization of the lens barrel 12 and improvement of a degree of freedom in design. In particular, the dimension in the thickness direction (radial direction of the lens barrel) is suppressed as compared with the configuration as in JP2016-157029A having the structure in which the two holding members sandwich the flange portion provided on the operation ring.

The restriction operation member 25 is rotatable around the rotational axis CL1 intersecting the optical axis O of the imaging optical system 22. Accordingly, an erroneous operation in which the focus ring 23 or the like rotatably provided around the optical axis O is mistaken for the restriction operation member 25 can be prevented without user viewing.

Figure 15:
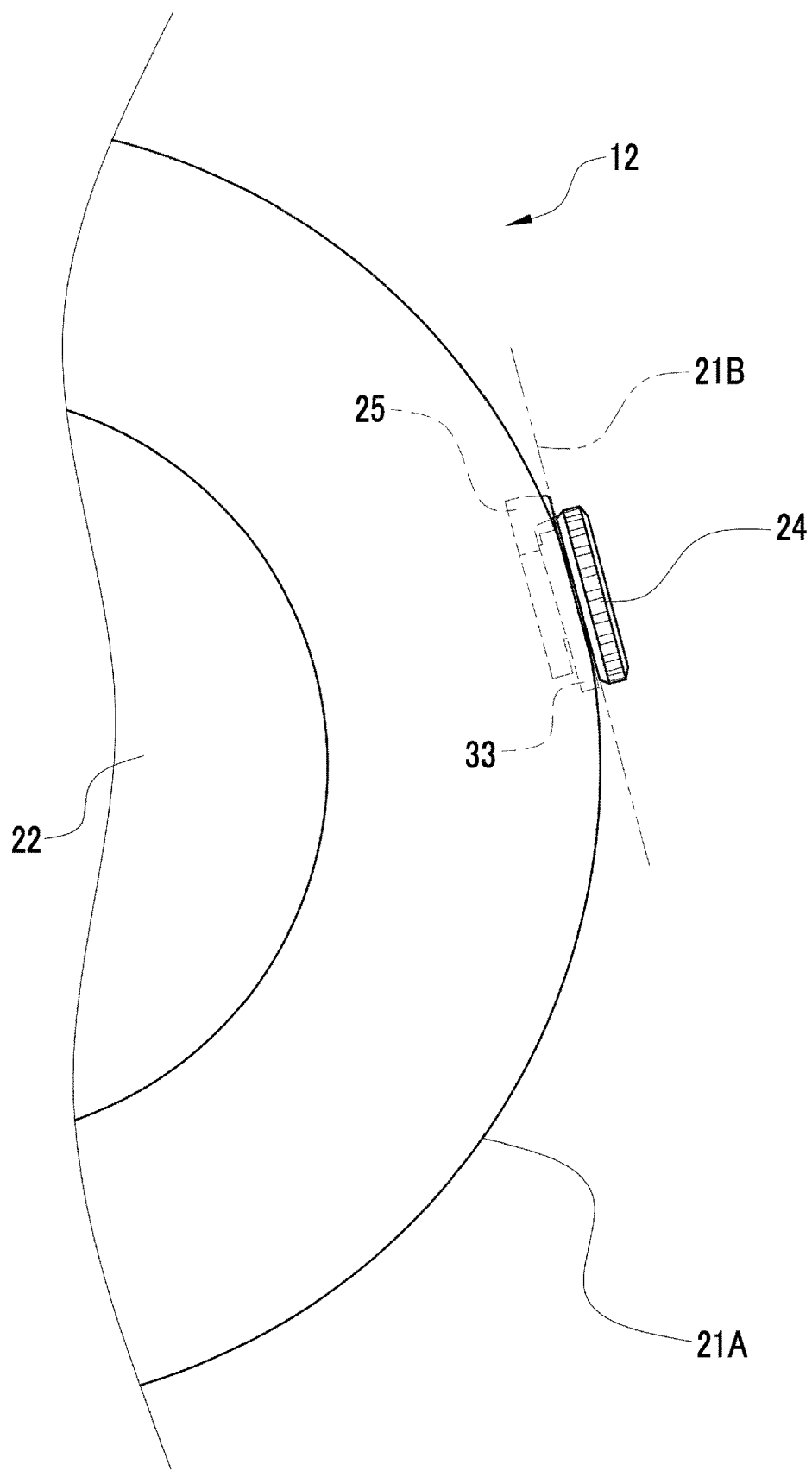
FIG. 15 is a front view of a periphery of an operation member showing a configuration of a modification example.

In the first embodiment, the dial operation member 24 is a rotating member that faces the mounting surface 32B recessed from the outer peripheral surface 21A and rotates around the rotational axis CL1 orthogonal to the mounting surface 32B, but the present invention is not limited thereto. As shown in FIG. 15, the dial operation member 24 may be a rotating member that faces a tangent surface 21B (surface indicated by two-dot chain line) that is in tangent contact with the outer peripheral surface 21A of the lens barrel 12 and rotates in the tangent surface 21B. In this case, the restriction operation member 25 and the cam member 33 are preferably located inside the lens barrel 12 in the radial direction as compared with the first embodiment.

Second Embodiment

In the first embodiment, an example is shown in which the dial operation member 24 rotatably provided around the rotational axis CL1 is put into the restriction state, but the present invention is not limited thereto. As an operation member, a pressing button that moves forward and backward along a mounting shaft may be put into the restriction state. A configuration other than configurations of a pressing button 81 as the operation member, a restriction mechanism 83, and a switch 88 is the same as that of the lens barrel 12 according to the first embodiment. The same reference numerals are assigned to the same parts, and a description thereof will be omitted.

The pressing button 81 is an operation member that adjusts the optical function of the imaging optical system 22, similarly to the dial operation member 24 according to the first embodiment. The pressing button 81 is mounted to a mounting piece 82. The mounting piece 82 constitutes a part of the lens barrel main body 21, similarly to the mounting piece 32 according to the first embodiment.

The restriction mechanism 83 comprises the mounting piece 82, the restriction operation member 25, and the cam member 33. The mounting piece 82 is formed in an arc shape continuous with the outer peripheral surface 21A of the lens barrel main body 21. The mounting piece 82 has a recessed portion 82A, a mounting surface 82B, a through-hole 82C, a ridge portion 82D, and a key protrusion (not shown). The recessed portion 82A is a portion recessed with respect to the outer peripheral surface 21A. The restriction operation member 25 is disposed inside the recessed portion 82A. The mounting surface 82B is a flat surface that is formed inside the recessed portion 82A and recessed from the outer peripheral surface 21A.

The ridge portion 82D is formed in an arc shape along the periphery of the mounting surface 82B and projects radially outward with respect to the outer peripheral surface 21A. A plurality of key protrusions are provided on the inner peripheral surface of the ridge portion 32D. The key protrusion extends in a parallel direction with a mounting shaft 86A described below and fits with the key groove 39 of the cam member 33.

The pressing button 81 comprises a button main body 86 and a spring member 87. The button main body 86 has the mounting shaft 86A and a pressed portion 86B. The mounting shaft 86A is formed in a columnar shape and fits with the through-hole 82C of the mounting piece 82. Accordingly, the pressing button 81 moves forward and backward with respect to the lens barrel main body 21 along the mounting shaft 86A intersecting the mounting surface 82B. The pressed portion 86B is formed in a disk shape having an outer diameter larger than that of the mounting shaft 86A and faces the mounting surface 82B.

The spring member 87 urges the pressing button 81 to the outside of the lens barrel main body 21 in the radial direction. The spring member 87 is a coil spring that is externally fitted to the mounting shaft 86A and is disposed between the mounting shaft 86A and the mounting piece 82. The spring member 87 is not limited thereto and may be any spring as long as the spring urges the pressing button 81 and may be, for example, a leaf spring.

The restriction operation member 25 and the cam member 33 have the same shape as that of the first embodiment. The restriction operation member 25 is disposed inside the recessed portion 82A and at a position facing the mounting surface 82B. The restriction operation member 25 is rotatably supported around the mounting shaft 86A. The cam member 33 is provided between the restriction operation member 25 and the pressed portion 86B of the pressing button 81. The cam member 33 is restricted from rotating around the mounting shaft 86A.

A base-end portion of the mounting shaft 86A faces the switch 88. The switch 88 is, for example, a well-known tact switch. The switch is in an ON state in a case where the switch is pressed, and the switch is in an OFF state in a case where the pressure thereon is released. The switch 88 is mounted to the inside of the lens barrel main body 21 via a substrate (not shown) or the like.

Figure 16A:
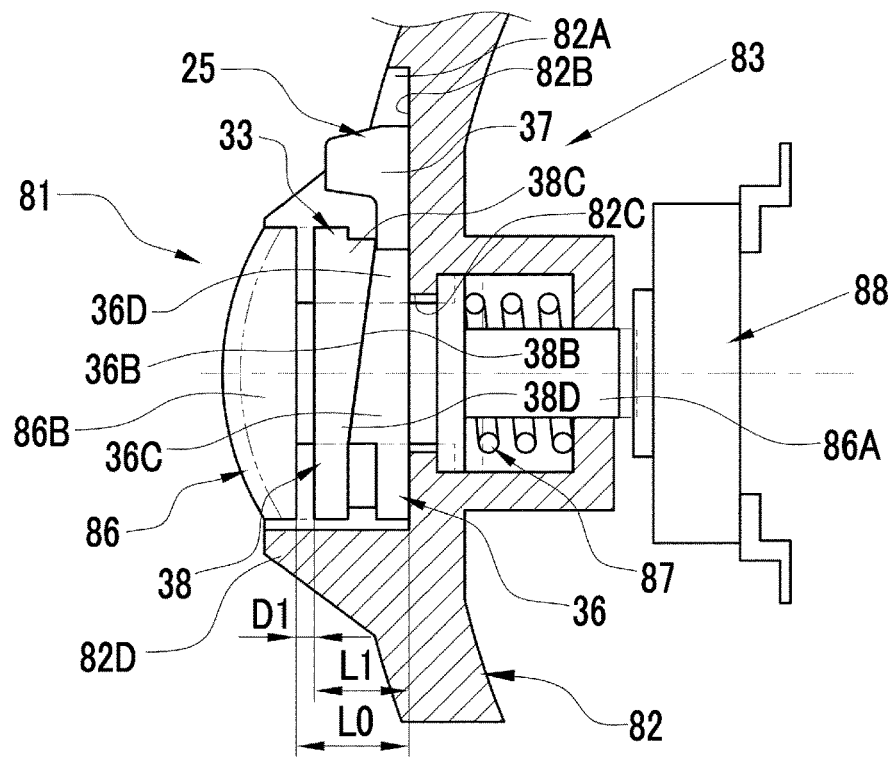
FIGS. 16A and 16B are diagrams for describing the operations of the first member and the second member in the second embodiment and are cross-sectional views of a main part showing a release state (FIG. 16A) and a restriction state (FIG. 16B).

In a case where the pressing button 81 is not pressed, the pressing button 81 is urged radially outward by the spring member 87, and thus the mounting shaft 86A does not contact the switch 88 (position indicated by solid line in FIG. 16A). Accordingly, the switch 88 is in the OFF state. On the other hand, in a case where the pressing button 81 is pressed, the pressing button 81 moves along the mounting shaft 86A against the urging of the spring member 87, and thus the mounting shaft 86A comes into contact with the switch 88 (position indicated by two-dot chain line in FIG. 16A). Accordingly, the switch 88 is pressed by the pressing button 81 and is in the ON state.

By being mounted to the mounting piece 82 and urged by the spring member 87, the pressed portion 86B is held at a constant spacing L0 from the mounting surface 82B (in a case where the pressing button 81 is not pressed by the user). The spacing L0 is a dimension in the thickness direction, that is, in the direction parallel to the rotational axis CL1.

As shown in FIG. 16A, in a case where the restriction operation member 25 is in the release position, the first thick portion 36C faces the second thin portion 38D, and the second thick portion 38C faces the first thin portion 36D. Therefore, the dimension L1 in the thickness direction, which is obtained by adding the restriction operation member 25 and the cam member 33, is smaller than the spacing L0. Accordingly, the restriction operation member 25 is in a state where the pressure on the cam member 33 is released. With the release of the pressure from the restriction operation member 25, the cam member 33 is separated from the pressed portion 86B. That is, since the dimension L1 in the thickness direction, which is obtained by adding the restriction operation member 25 and the cam member 33, is smaller than the spacing L0, the cam member 33 has the gap D1 with the pressed portion 86B. Accordingly, the pressing button 81 can be pressed by the user without being frictionally locked by the cam member 33.

Figure 16B:
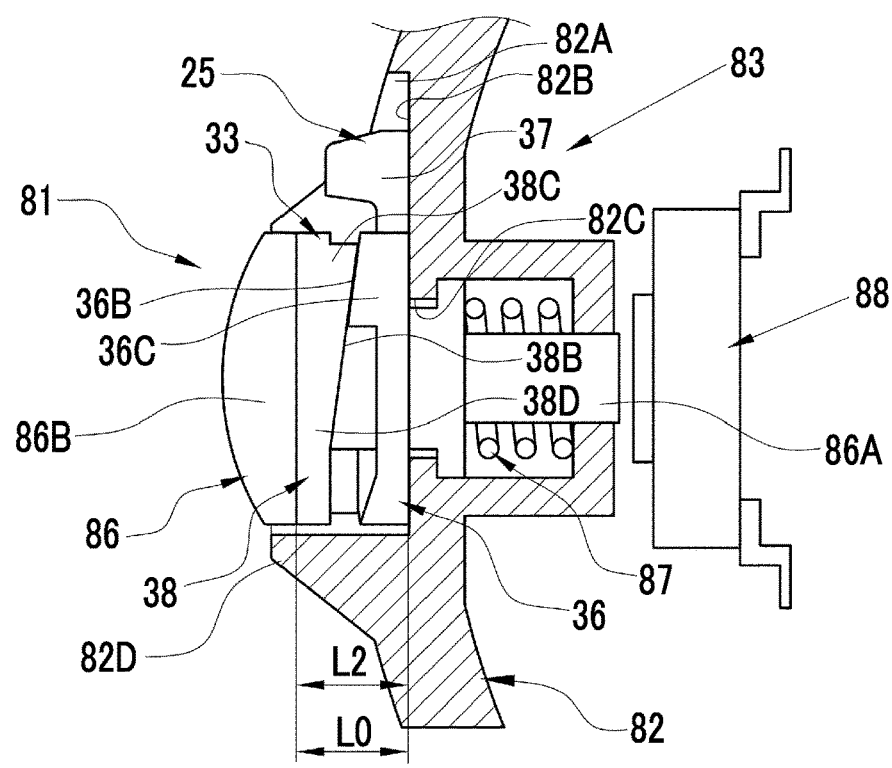

On the other hand, as shown in FIG. 16B, in a case where the restriction operation member 25 moves to the restriction position, the first thick portion 36C and the second thick portion 38C come into contact with each other. In this case, the cam member 33 receives the pressure from the restriction operation member 25 and moves to a side of the pressing button 81. With the contact between the first thick portion 36C and the second thick portion 38C, the dimension L2 in the thickness direction, which is obtained by adding the restriction operation member 25 and the cam member 33, becomes the spacing L0 or more, as compared with the case where the restriction operation member 25 is in the release position. Accordingly, a gap between the cam member 33 and the pressing button 81 is eliminated. Therefore, the pressing button 81 receives the pressure from the restriction operation member 25 via the cam member 33. That is, the pressing button 81 is frictionally locked by the cam member 33 and is in the restriction state where the forward and backward movement is restricted.

As in the first embodiment, the pressing button 81 is in the restriction state simply by rotating the restriction operation member 25 from the release position to the restriction position, and thus the operation sound is small in a case where the pressing button 81 is changed from the release state to the restriction state and from the restriction state to the release state. That is, the same effect as that of the lens barrel 12 according to the first embodiment can be obtained.

Third Embodiment

In the first and second embodiments, the configuration in which the restriction operation member 25 (first member) is provided coaxially with the operation member and rotatably between the restriction position and the release position is exemplified, but the present invention is not limited thereto. A configuration may be employed in which the first member slides between the release position and the restriction position. A configuration other than the configurations of the pressing button as the operation member, the switch, and the restriction mechanism is the same as that of the first and second embodiments. The same reference numerals are assigned to the same parts, and a description thereof will be omitted.

The restriction mechanism 91 comprises a mounting piece 92, a restriction operation member 93, and a cam member 94. The restriction mechanism according to the present embodiment puts the forward and backward movement of the pressing button 81 into the restriction state. The pressing button 81 has the same configuration as that of the second embodiment.

Figure 17A:
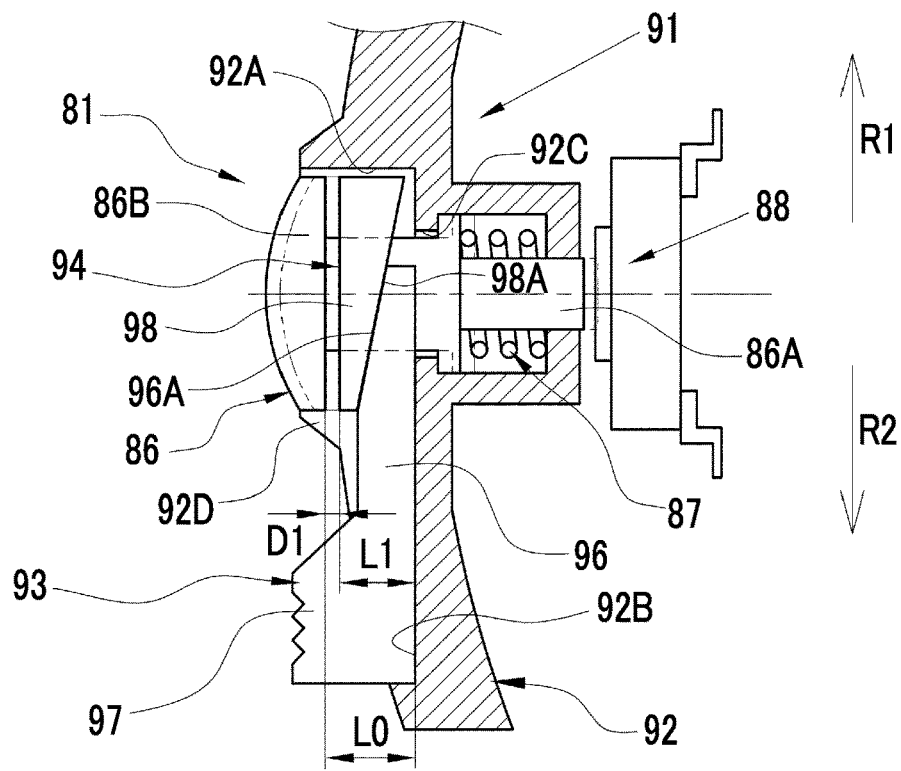
FIGS. 17A and 17B are diagrams for describing the operations of the first member and the second member in the third embodiment and are cross-sectional views of a main part showing a release state (FIG. 17A) and a restriction state (FIG. 17B).

As in the second embodiment, in a case where the pressing button 81 is not pressed, the mounting shaft 86A is not in contact with the switch 88 (position indicated by the solid line in FIG. 17A). Accordingly, the switch 88 is in the OFF state. On the other hand, in a case where the pressing button 81 is pressed, the mounting shaft 86A comes into contact with the switch 88 (position indicated by two-dot chain line in FIG. 17A). Accordingly, the switch 88 is pressed by the pressing button 81 and is in the ON state.

The mounting piece 92 has a recessed portion 92A, a mounting surface 92B, a through-hole 92C, and a ridge portion 92D. The recessed portion 92A is a portion recessed with respect to the outer peripheral surface 21A. The restriction operation member 93 is disposed inside the recessed portion 92A. The mounting surface 92B is a flat surface that is formed inside the recessed portion 92A and recessed from the outer peripheral surface 21A. The ridge portion 92D is formed in an arc shape along the periphery of the mounting surface 92B and projects radially outward with respect to the outer peripheral surface 21A.

The restriction operation member 93 has a first cam portion 96 and a finger hook portion 97. In a case where the restriction operation member 93 is operated, the user puts a finger on the finger hook portion 97 to slide the restriction operation member 93. The first cam portion 96 is slidably supported in a direction intersecting the mounting shaft 86A. That is, in the present embodiment, the movement direction R1 in which the restriction operation member 93 moves from the release position to the restriction position and the movement direction R2 in which the restriction operation member 25 moves from the restriction position to the release position are directions intersecting the mounting shaft 86A. The first cam portion 96 has a rectangular plate shape extending in the movement direction R1.

The first cam portion 96 has a first inclined surface 96A. The first inclined surface 96A is an inclined surface that is inclined with respect to the movement direction R1. The first cam portion 36 includes the first inclined surface 96A and has a tapered cross-sectional shape in the thickness direction. More specifically, the first cam portion 36 has the tapered shape in which a dimension of a portion including the first inclined surface 96A in the thickness direction gradually decreases toward the movement direction R1.

The cam member 94 corresponds to the second member within the scope of the claims. The cam member 94 is provided between the restriction operation member 93 and the pressed portion 86B of the pressing button 81. The cam member 94 has a second cam portion 98. The second cam portion 98 is formed in a disk shape or a rectangular plate shape having an outer diameter smaller than that of the pressed portion 86B.

The second cam portion 98 has a second inclined surface 98A. The second inclined surface 98A is an inclined surface that is disposed at a position facing the restriction operation member 93 and is inclined with respect to the movement direction RE The second cam portion 38 includes the second inclined surface 98A and has a tapered cross-sectional shape in the thickness direction. More specifically, the second cam portion 98 has the tapered shape in which a dimension of a portion including the second inclined surface 98A in the thickness direction gradually increases toward the movement direction R1.

By being mounted to the mounting piece 92 and urged by the spring member 87, the pressed portion 86B is held at a constant spacing L0 from the mounting surface 92B (in a case where the pressing button 81 is not pressed by the user). The spacing L0 is a dimension in the thickness direction, that is, in the direction parallel to the rotational axis CL1.

As shown in FIG. 17A, in a case where the restriction operation member 93 is in the release position, the dimension L1 in the thickness direction (refer to FIG. 17A), which is obtained by adding the restriction operation member 93 and the cam member 94, is smaller than the spacing L0. Accordingly, the restriction operation member 93 is in a state where the pressure on the cam member 94 is released. With the release of the pressure from the restriction operation member 93, the cam member 94 is separated from the pressed portion 86B. That is, since the dimension L1 in the thickness direction, which is obtained by adding the restriction operation member 93 and the cam member 94, is smaller than the spacing L0, the cam member 94 has the gap D1 with the pressed portion 86B. Accordingly, the pressing button 81 can be pressed without being frictionally locked by the cam member 94.

Figure 17B:
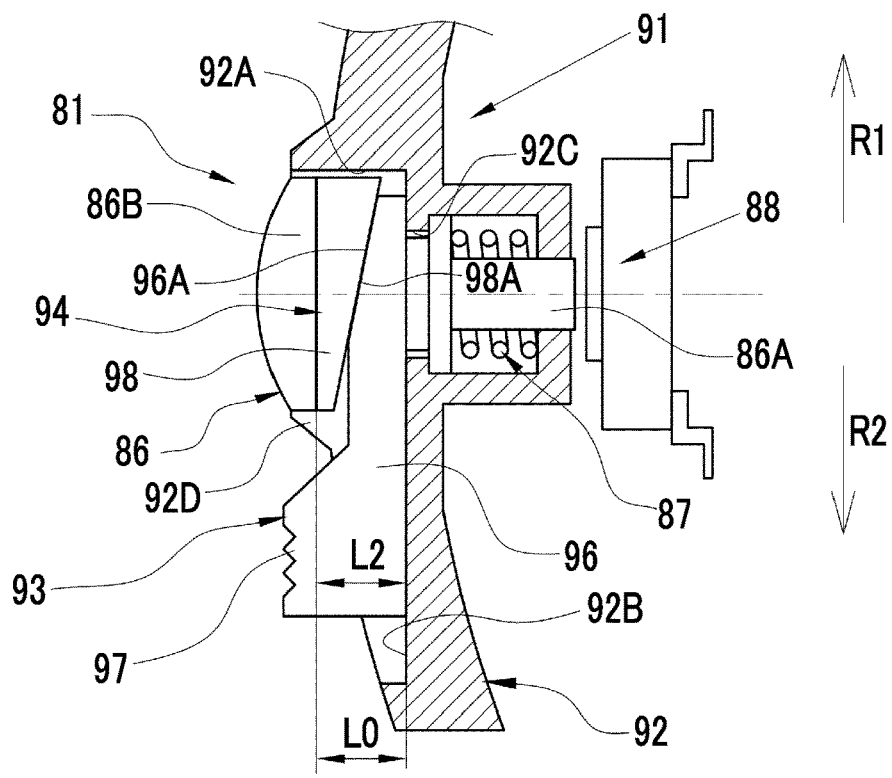

On the other hand, as shown in FIG. 17B, in a case where the restriction operation member 93 moves to the restriction position, the cam member 33 receives the pressure from the restriction operation member 25 and moves to the side of the pressing button 81. The dimension L2 in the thickness direction (refer to FIG. 17B), which is obtained by adding the restriction operation member 93 and the cam member 94, becomes the spacing L0 or more, as compared with the case where the restriction operation member 25 is in the release position. Accordingly, a gap between the cam member 94 and the pressing button 81 is eliminated. Therefore, the pressing button 81 receives the pressure from the restriction operation member 93 via the cam member 94. That is, the pressing button 81 is frictionally locked by the cam member 94 and is in the restriction state where the movement forward and backward is restricted.

As in the first and second embodiments, the pressing button 81 is in the restriction state simply by sliding the restriction operation member 93 from the release position to the restriction position, and thus the operation sound is small in a case where the pressing button 81 is changed from the release state to the restriction state and from the restriction state to the release state. That is, the same effect as that of the lens barrel 12 according to the first and second embodiments can be obtained.

In the third embodiment, an example is shown in which the forward and backward movement of the pressing button 81 as the operation member is put into the restriction state by the restriction operation member 93 and the cam member 94, but the present invention is not limited thereto. The rotating member, such as the dial operation member 24, as the operation member may be combined with the restriction operation member 93 and the cam member 94 to put the rotation of the rotating member into the restriction state.

In the second and third embodiments, the pressing button 81 is a pressing button that faces the mounting surfaces 82B and 92B recessed from the outer peripheral surface 21A and moves forward and backward in the direction intersecting the mounting surfaces 82B and 92B, but the invention is not limited thereto. The pressing button 81 may be a pressing button that faces the tangent surface 21B (refer to FIG. 15) that is in tangent contact with the outer peripheral surface 21A of the lens barrel 12 and moves forward and backward in a direction intersecting the tangent surface 21B.

In each of the above embodiments, the change of the shutter speed is exemplified as the optical function of the imaging optical system 22 that performs the adjustment with the operation member such as the dial operation member 24 or the pressing button 81, but the present invention is not limited thereto. The adjustment may be any adjustment related to the optical function of the imaging optical system 22 and may be any one of, for example, the stop, camera shake correction amount, or angle of view changing of the imaging optical system 22.

Further, in each of the above embodiments, an example is shown in which the optical function of the imaging optical system 22 is adjusted by the operation member such as the dial operation member 24 or the pressing button 81, but the present invention is not limited thereto. For example, the lens control unit 51 or the camera body control unit 61 controls to switch the functions to be executed in response to the operation by the operation member. In a case where the lens barrel 12 is attached to the camera body 11, the lens control unit 51 or the camera body control unit 61 may perform the control of operating the camera body 11, instead of adjusting the optical function of the imaging optical system 22, in response to the operation by the dial operation member 24 or the pressing button 81. Further, in this case, in a case where the restriction operation members 25 and 93 are operated to put the operation member in the restriction state, a release lock state, power on/off switching of the camera body 11, transition to a power sleep mode, and the like are preferably performed.

In each of the above embodiments, the first member and the second member have the tapered shapes and thus have the thick and thin portions, but the present invention is not limited thereto. A configuration may be employed in which at least the first member has portions having different thicknesses in the movement direction, and a minimum value of a sum of the dimensions of the first member and the second member in the thickness direction is smaller than the spacing L0 and a maximum value of the sum of the dimensions of the first member and the second member in the thickness direction is the spacing L0 or more. Accordingly, the first member can be put into the restriction state and the release state as in each of the above embodiments.

In each of the above embodiments, a hardware structure of the processing unit that executes various processing, such as the lens control unit 51 and the camera body control unit 61, is various processors as shown below. The various processors include a central processing unit (CPU) and a graphical processing unit (GPU), which are general-purpose processors that execute software (program) to function as various processing units, a programmable logic device (PLD), which is a processor whose circuit configuration can be changed after manufacturing, such as a field programmable gate array (FPGA), a dedicated electric circuit, which is a processor having a circuit configuration specially designed to execute various processing, and the like.

One processing unit may be configured by one of the various processors or a combination of two or more processors of the same type or different types (for example, a plurality of FPGAs, a combination of CPU and FPGA, or a combination of CPU and GPU). The plurality of processing units may be composed of one processor. As an example in which the plurality of processing units are configured by one processor, firstly, as represented by a computer such as a client and a server, there is a form in which one processor is configured by a combination of one or more CPUs and software and the processor functions as the plurality of processing units. Second, as represented by a system-on-chip (SoC) or the like, there is a form in which a processor that realizes the functions of the entire system including the plurality of processing units with one integrated circuit (IC) chip is used. As described above, the various processing units are configured by using one or more various processors as the hardware structure.

Further, the hardware structure of the various processors, more specifically, is an electric circuit (circuitry) in which circuit elements such as semiconductor elements are combined.

The present invention can be applied to imaging devices such as a smartphone and a video camera in addition to the digital camera.

EXPLANATION OF REFERENCES

10: digital camera
11: camera body
11A: grip portion
12: lens barrel
13: lens mount
13A imaging aperture
14: release switch
16: imaging element
17: body-side signal contact
21: lens barrel main body
21A: outer peripheral surface
21B: tangent surface
22: imaging optical system
22a: focus lens
22b: zoom lens
22c: camera shake correction lens
23: focus ring
24: dial operation member
24A: operation member main body
24B: male screw
24C: blindfold member 24D: female screw hole
25: restriction operation member
26: mode switching operation member
27: lens mount
28: lens-side signal contact
29: restriction mechanism
31: shaft member
31A: female screw hole
31B: base-end portion
32: mounting piece
32A: recessed portion
32B: mounting surface
32C: through-hole
32D: ridge portion
32E: key protrusion
33: cam member
34: rotation amount detection sensor
36: first cam portion
36A: through-hole
36B: first inclined surface
36C: first thick portion
36D: first thin portion
37: finger hook portion
38: second cam portion
38A: through-hole
38B: second inclined surface
38C: second thick portion
38D: second thin portion
39: key groove
51: lens control unit
52: motor driver
53: camera shake detection sensor
54 to 57: motor
58: stop unit
58a: stop leaf blade
61: camera body control unit
62: shutter unit
63: motor driver
64: image memory
65: bus line
66: image data processing unit
67: LCD driver
68: image display unit
69: card interface (I/F)
71: memory card
72: automatic exposure (AE) processing unit
73: shutter motor
81: pressing button
82: mounting piece
82A: recessed portion
82B: mounting surface
82C: through-hole
82D: ridge portion
83: restriction mechanism
86: button main body
86A: mounting shaft
86B: pressed portion
87: spring member
88: switch
91: restriction mechanism
92: mounting piece
92A: recessed portion
92B: mounting surface
92C: through-hole
92D: ridge portion
93: restriction operation member
94: cam member
96: first cam portion
96A: first inclined surface
97: finger hook portion
98: second cam portion
98A: second inclined surface
CL1: rotational axis
D1: gap
E1: range
E2: range
L0: spacing
L1: dimension
L2: dimension
O: optical axis
OA: optical axis direction
P0: reference position
R1: movement direction
R2: movement direction

What is claimed is:

1. A lens barrel comprising:
a lens barrel main body that holds an optical system;
an operation member that is provided around the lens barrel main body and adjusts an optical function of the optical system;
a first member that is movably provided between a restriction position and a release position and has a first inclined surface inclined with respect to a movement direction from the release position toward the restriction position; and
a second member that is provided between the first member and the operation member and has a second inclined surface,
wherein, in a case where the first member is in the restriction position, the operation member is put into a restriction state in which movement of the operation member is restricted by receiving pressure from the first member via the second member, and
wherein, in a case where the first member is in the release position, the operation member is put into a release state in which the second member is separated from the operation member with the release of the pressure from the first member.

2. The lens barrel according to claim 1,
wherein the first member includes the first inclined surface and has a tapered cross-sectional shape in a thickness direction intersecting the movement direction, and
the second member includes the second inclined surface and has the tapered cross-sectional shape in the thickness direction.

3. The lens barrel according to claim 1,
wherein the first inclined surface engages with the second inclined surface.

4. The lens barrel according to claim 1,
wherein the second inclined surface is disposed at a position facing the first member.

5. The lens barrel according to claim 1,
wherein in a case where the first member moves to the release position, the operation member is put into the release state.

6. The lens barrel according to claim 1,
wherein the second member puts the operation member into the restriction state in the case where the first member is in the restriction position.

7. The lens barrel according to claim 6,
wherein the second member receives pressure from the first member in the case where the first member is in the restriction position.

8. The lens barrel according to claim 6,
wherein the second member puts the operation member into the restriction state by frictionally locking the operation member and puts the operation member into a release state in a case where pressure from the first member is released.

9. The lens barrel according to claim 6,
wherein the first member has a first thick portion and a first thin portion having a smaller dimension in a thickness direction intersecting the movement direction than the first thick portion,
the second member has a second thick portion and a second thin portion having a smaller dimension in the thickness direction than the second thick portion, and
the first member presses the second member toward the operation member with the first thick portion and the second thick portion in contact with each other in a case where the first member moves to the restriction position.

10. The lens barrel according to claim 9,
wherein the first member releases pressure on the second member with the first thick portion and the second thin portion facing each other and the second thick portion and the first thin portion facing each other in a case where the first member is moved to the release position.

11. The lens barrel according to claim 1,
wherein the operation member faces a tangent surface in tangent contact with an outer peripheral surface of the lens barrel main body or a mounting surface which is a surface recessed from the outer peripheral surface.

12. The lens barrel according to claim 11,
wherein the operation member is a rotating member that rotates within the tangent surface.

13. The lens barrel according to claim 11,
wherein the operation member is a rotating member that rotates around a rotational axis orthogonal to the mounting surface.

14. The lens barrel according to claim 12,
wherein the first member is provided coaxially with the operation member and rotatably between the restriction position and the release position.

15. The lens barrel according to claim 12,
wherein one of the second member and the lens barrel main body has a recessed portion extending in a direction parallel to a rotational axis of the rotating member, and
the other of the second member and the lens barrel main body has a projected portion that slidably fits with the recessed portion.

16. The lens barrel according to claim 12,
wherein a plurality of the first inclined surfaces are provided on the first member, and
the second inclined surface is provided on the second member in the same number as the first inclined surface.

17. The lens barrel according to claim 16,
wherein the first inclined surfaces are provided around a rotational axis of the rotating member at equal angular spacings, and
the second inclined surfaces are provided around the rotational axis at the equal angular spacings.

18. The lens barrel according to claim 16,
wherein the first inclined surface and the second inclined surface are disposed around a rotational axis of the rotating member at a spacing of 180°.

19. The lens barrel according to claim 1,
wherein the operation member faces a tangent surface in tangent contact with an outer peripheral surface of the lens barrel main body or a mounting surface which is a surface recessed from the outer peripheral surface, and
the first member is a slide member that slides between the release position and the restriction position.

20. The lens barrel according to claim 1,
wherein the operation member is a pressing button that faces a tangent surface in tangent contact with an outer peripheral surface of the lens barrel main body or a mounting surface which is a surface recessed from the outer peripheral surface and moves forward and backward along a mounting shaft intersecting the tangent surface or the mounting surface.

21. The lens barrel according to claim 1,
wherein the lens barrel is detachable from and attachable to a camera main body, and
the operation member and the first member are provided around the lens barrel on a side opposite to a grip portion of the camera main body.

22. The lens barrel according to claim 21,
wherein in a case where an upper position around the lens barrel in a vertical direction is a reference position, a camera main body side of the lens barrel in an optical axis direction of the optical system is a rear surface side, and a subject side opposite to the camera main body side is a front surface side, the operation member and the first member are provided on a left-side surface side around the lens barrel with the reference position as a base point.

23. The lens barrel according to claim 22,
wherein the operation member and the first member are disposed within a range of 0° to 90° around an optical axis of the optical system with the reference position as a base point.

24. An imaging device comprising:
the lens barrel according to claim 1; and
a camera main body.

25. The imaging device according to claim 24, the device further comprising:
a processor that switches a function to be executed in response to an operation by the operation member,
wherein the processor performs, in a case where the lens barrel is attached to the camera main body, control of operating the camera main body, instead of adjusting the optical function, in response to the operation by the operation member.

26. The lens barrel according to claim 1, wherein the operation member and the first member are provided around the lens barrel main body.

* * * * *